(12) United States Patent
Yang et al.

(10) Patent No.: US 11,990,994 B2
(45) Date of Patent: May 21, 2024

(54) REFERENCE SIGNAL DESIGN

(71) Applicant: QUALCOMM Incorporated, San Diego, CA (US)

(72) Inventors: Wei Yang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/902,664

(22) Filed: Jun. 16, 2020

(65) Prior Publication Data

US 2020/0403675 A1    Dec. 24, 2020

Related U.S. Application Data

(60) Provisional application No. 62/862,935, filed on Jun. 18, 2019.

(51) Int. Cl.
*H04L 1/00* (2006.01)
*H04B 7/06* (2006.01)
(Continued)

(52) U.S. Cl.
CPC ......... *H04L 1/0026* (2013.01); *H04B 7/0626* (2013.01); *H04B 7/0632* (2013.01);
(Continued)

(58) Field of Classification Search
None
See application file for complete search history.

(56) References Cited

U.S. PATENT DOCUMENTS 7,430,152 B1 * 9/2008 Russo .............. H04R 1/44
                                                    367/2
9,935,664 B1 * 4/2018 Dai ............... H04B 1/1027
(Continued)

FOREIGN PATENT DOCUMENTS

CN    101415205 A    4/2009
CN    106161313 A    11/2016
(Continued)

OTHER PUBLICATIONS

Huawei., et al., "On Remaining Issues About pi/2-BPSK FDSS", 3GPP Draft, 3GPP TSG RAN WG1 Meeting #90, R1-1713781, 3rd Generation Partnership Project (3GPP), Mobile Competence Centre, 650, Route Des Lucioles, F-06921, Sophia-Antipolis Cedex, France, vol. RAN WG1. No. Prague. Czech Republic, Aug. 21-Aug. 25, 2017, Aug. 20, 2017 (Aug. 20, 2017), XP051316580, 5 pages, Retrieved from the Internet: URL: http://www.3gpp.org/ftp/Meetings_3GPP_SYNC/RAN1/Docs/—[retrieved on Aug. 20, 2017] Section 2.
(Continued)

*Primary Examiner* — Rebecca E Song
(74) *Attorney, Agent, or Firm* — Holland & Hart LLP

(57) ABSTRACT

Methods, systems, and devices for wireless communications are described. A method of wireless communication is described. A user equipment (UE) may receive an indication of one or more filter coefficients used by a base station to filter a reference signal used by the UE to determine channel quality information (CQI). The UE may receive a reference signal from the base station, and may determine the CQI based on the received reference signal and the one or more filter coefficients. The UE may transmit the determined CQI to the base station.

30 Claims, 16 Drawing Sheets

(51) Int. Cl.
*H04L 5/00* (2006.01)
*H04L 27/233* (2006.01)
*H04L 27/26* (2006.01)

(52) U.S. Cl.
CPC ........ *H04L 5/0048* (2013.01); *H04L 27/2334* (2013.01); *H04L 27/2613* (2013.01); *H04L 27/2614* (2013.01); *H04L 27/26136* (2021.01)

(56) References Cited

U.S. PATENT DOCUMENTS

| | | | |
|---|---|---|---|
| 10,644,731 B2 * | 5/2020 | Pratt | H04B 1/0475 |
| 2005/0282500 A1 * | 12/2005 | Wang | H04L 1/20 455/67.11 |
| 2013/0039446 A1 * | 2/2013 | Roh | H04L 25/0204 375/340 |
| 2013/0194931 A1 * | 8/2013 | Lee | H04W 72/04 370/241 |
| 2015/0023193 A1 * | 1/2015 | Zhang | H04W 24/10 370/252 |
| 2016/0105265 A1 * | 4/2016 | Wang | H04B 17/309 370/252 |
| 2017/0126380 A1 | 5/2017 | Kim et al. | |
| 2017/0201317 A1 * | 7/2017 | Lee | H04B 7/26 |
| 2018/0159673 A1 * | 6/2018 | Wang | H04B 17/309 |
| 2019/0058508 A1 * | 2/2019 | Yiu | H04B 7/043 |
| 2020/0229185 A1 * | 7/2020 | Zhang | H04B 7/0695 |
| 2020/0396628 A1 * | 12/2020 | Kim | H04L 5/003 |
| 2021/0337549 A1 * | 10/2021 | Zhang | H04L 5/0048 |
| 2021/0400556 A1 * | 12/2021 | Määttänen | H04W 36/0085 |

FOREIGN PATENT DOCUMENTS

| | | | |
|---|---|---|---|
| CN | 107222442 A | 9/2017 | |
| WO | WO-2013074025 A2 * | 5/2013 | ............ H04B 17/26 |
| WO | WO-2019029790 A1 | 2/2019 | |

OTHER PUBLICATIONS

International Search Report and Written Opinion—PCT/US2020/038188—ISA/EPO—dated Sep. 30, 2020 (193124WO).

Samsung: "Spectrum Shaping for [pi]/2-BPSK DFT-s-OFDM," 3GPP Draft, 3GPP TSG RAN WG1 Meeting #89, R1-1709043_SS_FOR_PI2-BPSK-DFT-S-OFDM_R0, 3rd Generation Partnership Project (3GPP), Mobile Competence Centre, 650, Route Des Lucioles, F-06921, Sophia-Antipolis Cedex, France, vol. RAN WG1. No. Hangzhou; May 15-May 19, 2017, May 5, 2017 (May 5, 2017), XP051261537, 5 pages, Retrieved from the Internet: URL: http://www.3gpp.org/ftp/tsg_ran/WG1_RL1/TSGR1_89/Docs/— [retrieved on May 5, 2017] Sections 2 and 4.

* cited by examiner

Reference Signal 210

REFERENCE SIGNAL DESIGN

CROSS REFERENCE

The present application for patent claims the benefit of U.S. Provisional Patent Application No. 62/862,935 by Yang et al., entitled "REFERENCE SIGNAL DESIGN," filed Jun. 18, 2019, assigned to the assignee hereof, and expressly incorporated by reference in its entirety herein.

BACKGROUND

The following relates generally to wireless communications, and more specifically to reference signal design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may transmit a reference signal (e.g., a channel state information reference signal (CSI-RS)). In some cases, the reference signal may have a high path loss and a low coverage area due to a low transmit power. It may be desirable for the reference signal to cover a larger area (e.g., larger than the serving area of the base station) to improve communication.

SUMMARY

The described techniques relate to improved methods, systems, devices, and apparatuses that support reference signal design. Generally, the described techniques provide for improving reference signal design (e.g., to decrease the peak-to-average power ratio (PAPR) of the reference signal) so that it can be transmitted over a larger area to improve coverage of the reference signal. A user equipment (UE) may receive filter coefficients from a base station to receive and interpret a reference signal transmitted to the UE by the base station. The UE may use the filtered reference signal (e.g., a CSI-RS) to determine channel quality information (CQI) and transmit the CQI to the base station.

A method of wireless communication at a UE is described. The method may include receiving an indication of one or more filter coefficients used by a base station to filter a reference signal used by the UE to determine CQI, receiving the reference signal from the base station, determining the CQI based on the received reference signal and the one or more filter coefficients, and transmitting the determined CQI to the base station.

A method of wireless communication at a UE is described. The method may include determining an indication of one or more filter coefficients used by a base station to filter a reference signal, where the reference signal used by the UE to determine CQI, receiving the reference signal from the base station, determining the CQI based on the received reference signal and the one or more filter coefficients, and transmitting the determined CQI to the base station.

An apparatus for wireless communication at a UE is described. The apparatus may include a processor, memory coupled with the processor, and instructions stored in the memory. The instructions may be executable by the processor to cause the apparatus to receive an indication of one or more filter coefficients used by a base station to filter a reference signal used by the UE to determine CQI, receive the reference signal from the base station, determine the CQI based on the received reference signal and the one or more filter coefficients, and transmit the determined CQI to the base station.

An apparatus for wireless communication at a UE is described. The apparatus may include a processor, memory coupled with the processor, and instructions stored in the memory. The instructions may be executable by the processor to cause the apparatus to determine one or more filter coefficients used by a base station to filter a reference signal, where the reference signal is used by the UE to determine CQI, receive the reference signal from the base station, determine the CQI based on the received reference signal and the one or more filter coefficients, and transmit the determined CQI to the base station.

Another apparatus for wireless communication at a UE is described. The apparatus may include means for receiving an indication of one or more filter coefficients used by a base station to filter a reference signal used by the UE to determine CQI, receiving the reference signal from the base station, determining the CQI based on the received reference signal and the one or more filter coefficients, and transmitting the determined CQI to the base station.

Another apparatus for wireless communication at a UE is described. The apparatus may include means for determining one or more filter coefficients used by a base station to filter a reference signal, where the reference signal is used by the UE to determine CQI, receiving the reference signal from the base station, determining the CQI based on the received reference signal and the one or more filter coefficients, and transmitting the determined CQI to the base station.

A non-transitory computer-readable medium storing code for wireless communication at a UE is described. The code may include instructions executable by a processor to receive an indication of one or more filter coefficients used by a base station to filter a reference signal used by the UE to determine CQI, receive the reference signal from the base station, determine the CQI based on the received reference signal and the one or more filter coefficients, and transmit the determined CQI to the base station.

A non-transitory computer-readable medium storing code for wireless communication at a UE is described. The code may include instructions executable by a processor to determine one or more filter coefficients used by a base station to filter a reference signal, where the reference signal is used by the UE to determine CQI, receive the reference signal from the base station, determine the CQI based on the received reference signal and the one or more filter coefficients, and transmit the determined CQI to the base station.

Some examples of the method, apparatuses, and non-transitory computer-readable medium described herein may further include operations, features, means, or instructions for applying a filter to the received reference signal using the one or more filter coefficients, where determining the CQI may be based on applying the filter to the reference signal.

Some examples of the method, apparatuses, and non-transitory computer-readable medium described herein may further include operations, features, means, or instructions for determining first filter coefficients for a first filter associated with a first subband of the reference signal and second filter coefficients for a second filter associated with a second subband of the reference signal, and applying the first filter to the first subband of the reference signal and the second filter to the second subband of the reference signal, where determining the CQI may be based on applying the first filter and the second filter.

Some examples of the method, apparatuses, and non-transitory computer-readable medium described herein may further include operations, features, means, or instructions for determining, based on determining the first filter coefficients and the second filter coefficients, third filter coefficients for a third filter associated with the first subband and fourth filter coefficients for a fourth filter associated with the second subband, receiving a downlink signal, and applying the third filter to the first subband of the downlink signal and the fourth filter to the second subband of the downlink signal.

In some examples of the method, apparatuses, and non-transitory computer-readable medium described herein, the first filter coefficients and the second filter coefficients may be based on the one or more filter coefficients received from the base station.

Some examples of the method, apparatuses, and non-transitory computer-readable medium described herein may further include operations, features, means, or instructions for determining that a first bandwidth of the first subband may be equal to a second bandwidth of the second subband, where the first filter coefficients may be a same set of filter coefficients as the second filter coefficients based on the first bandwidth equaling the second bandwidth.

In some examples of the method, apparatuses, and non-transitory computer-readable medium described herein, a first bandwidth of the received reference signal may be different than a second bandwidth associated with the CQI transmitted by the UE to the base station.

Some examples of the method, apparatuses, and non-transitory computer-readable medium described herein may further include operations, features, means, or instructions for identifying a filtering configuration applied to the reference signal, identifying a filter to apply to the reference signal based on identifying the filtering configuration, and applying the filter to the reference signal, where determining the CQI may be based on applying the filter.

Some examples of the method, apparatuses, and non-transitory computer-readable medium described herein may further include operations, features, means, or instructions for receiving, from the base station, an indication of the filtering configuration applied to the reference signal, where identifying the filtering configuration may be based on the received indication of the filtering configuration.

Some examples of the method, apparatuses, and non-transitory computer-readable medium described herein may further include operations, features, means, or instructions for identifying one or more parameters of a downlink channel configuration, where identifying the filtering configuration may be based on identifying the one or more parameters of the downlink channel configuration.

In some examples of the method, apparatuses, and non-transitory computer-readable medium described herein, the one or more filter coefficients include one or more time-domain filter coefficients.

In some examples of the method, apparatuses, and non-transitory computer-readable medium described herein, the one or more filter coefficients include one or more frequency-domain filter coefficients.

In some examples of the method, apparatuses, and non-transitory computer-readable medium described herein, the one or more filter coefficients may be associated with a set of frequency ranges.

Some examples of the method, apparatuses, and non-transitory computer-readable medium described herein may further include operations, features, means, or instructions for determining that the reference signal and a second signal may be quasi-collocated, where one or more filter coefficients associated with the second signal may be a same set of filter coefficients as the one or more filter coefficients associated with the reference signal.

Some examples of the method, apparatuses, and non-transitory computer-readable medium described herein may further include operations, features, means, or instructions for determining a type of quasi-collocation of the reference signal and a second signal, where the one or more filter coefficients associated with the reference signal and one or more filter coefficients associated with the second signal may be based on the type of quasi-collocation.

Some examples of the method, apparatuses, and non-transitory computer-readable medium described herein may further include operations, features, means, or instructions for determining a type of quasi-collocation of the reference signal and a second signal, where the second signal may be unfiltered based on the type of quasi-collocation.

In some examples of the method, apparatuses, and non-transitory computer-readable medium described herein, the reference signal may be modulated using $$\frac{\pi}{2}$$

phase shift keying (BPSK) modulation scheme.

In some examples of the method, apparatuses, and non-transitory computer-readable medium described herein, the reference signal includes a CSI-RS.

Some examples of the method, apparatuses, and non-transitory computer-readable medium described herein may further include operations, features, means, or instructions for receiving an unfiltered reference signal from the base station, where a first peak to average power ratio of the filtered reference signal may be less than a second peak to average power ratio of the unfiltered reference signal.

Some examples of the method, apparatuses, and non-transitory computer-readable medium described herein may further include operations, features, means, or instructions for receiving an indication of the one or more filter coefficients, and identifying the one or more coefficients based at least in part on the indication.

A method of wireless communication at a base station is described. The method may include transmitting an indication of one or more filter coefficients used by the base station to filter a reference signal used by a UE to determine CQI, generating the reference signal based on the one or more filter coefficients, transmitting the reference signal to the UE, and receiving, from the UE, the CQI at least in part in response to the transmitted reference signal.

An apparatus for wireless communication at a base station is described. The apparatus may include a processor, memory coupled with the processor, and instructions stored in the memory. The instructions may be executable by the processor to cause the apparatus to transmit an indication of one or more filter coefficients used by the base station to filter a reference signal used by a UE to determine CQI, generate the reference signal based on the one or more filter coefficients, transmit the reference signal to the UE, and receive, from the UE, the CQI at least in part in response to the transmitted reference signal.

Another apparatus for wireless communication at a base station is described. The apparatus may include means for transmitting an indication of one or more filter coefficients used by the base station to filter a reference signal used by a UE to determine CQI, generating the reference signal based on the one or more filter coefficients, transmitting the reference signal to the UE, and receiving, from the UE, the CQI at least in part in response to the transmitted reference signal.

A non-transitory computer-readable medium storing code for wireless communication at a base station is described. The code may include instructions executable by a processor to transmit an indication of one or more filter coefficients used by the base station to filter a reference signal used by a UE to determine CQI, generate the reference signal based on the one or more filter coefficients, transmit the reference signal to the UE, and receive, from the UE, the CQI at least in part in response to the transmitted reference signal.

Some examples of the method, apparatuses, and non-transitory computer-readable medium described herein may further include operations, features, means, or instructions for applying a filter that uses the one or more filter coefficients to the reference signal, where generating the reference signal may be based on applying the filter.

Some examples of the method, apparatuses, and non-transitory computer-readable medium described herein may further include operations, features, means, or instructions for determining that the reference signal and a second signal may be quasi-collocated, and associating the one or more filter coefficients of the reference signal with the second signal based on the reference signal and the second signal being quasi-collocated.

Some examples of the method, apparatuses, and non-transitory computer-readable medium described herein may further include operations, features, means, or instructions for determining a type of quasi-collocation of the reference signal and a second signal, and determining the one or more filter coefficients based on the type of quasi-collocation, where transmitting the indication may be based on determining the one or more filter coefficients.

Some examples of the method, apparatuses, and non-transitory computer-readable medium described herein may further include operations, features, means, or instructions for determining a type of quasi-collocation of the reference signal and a second signal, filtering the reference signal based on the type of quasi-collocation, and refraining from filtering the second signal based on the type of quasi-collocation.

Some examples of the method, apparatuses, and non-transitory computer-readable medium described herein may further include operations, features, means, or instructions for identifying a type of the reference signal, where the one or more filter coefficients may be based on the type of the reference signal.

Some examples of the method, apparatuses, and non-transitory computer-readable medium described herein may further include operations, features, means, or instructions for modulating the reference signal using a $$\frac{\pi}{2}$$

BPSK modulation scheme, where transmitting the reference signal may be based on modulating the reference signal using the $$\frac{\pi}{2}$$

BPSK modulation scheme.

Some examples of the method, apparatuses, and non-transitory computer-readable medium described herein may further include operations, features, means, or instructions for identifying one or more time-domain filter coefficients, where the one or more filter coefficients include the one or more time-domain filter coefficients.

Some examples of the method, apparatuses, and non-transitory computer-readable medium described herein may further include operations, features, means, or instructions for identifying one or more frequency-domain filter coefficients, where the one or more filter coefficients include the one or more frequency-domain filter coefficients.

Some examples of the method, apparatuses, and non-transitory computer-readable medium described herein may further include operations, features, means, or instructions for identifying a filtering configuration associated with the reference signal, where the one or more filter coefficients may be based on the filtering configuration, and applying a filter to the reference signal that uses the one or more filter coefficients, where transmitting the reference signal may be based on applying the filter.

Some examples of the method, apparatuses, and non-transitory computer-readable medium described herein may further include operations, features, means, or instructions for transmitting an indication of the filtering configuration to the UE, where transmitting the one or more filter coefficients may be based on transmitting the indication of the filter configuration.

In some examples of the method, apparatuses, and non-transitory computer-readable medium described herein, the reference signal includes a CSI-RS.

Some examples of the method, apparatuses, and non-transitory computer-readable medium described herein may further include operations, features, means, or instructions for transmitting an unfiltered reference signal to the UE, where a first peak to average power ratio of the filtered reference signal may be less than a second peak to average power ratio of the unfiltered reference signal.

In some examples of the method, apparatuses, and non-transitory computer-readable medium described herein, the filter includes a frequency domain spectral shaping filter.

DETAILED DESCRIPTION

Figure 1:
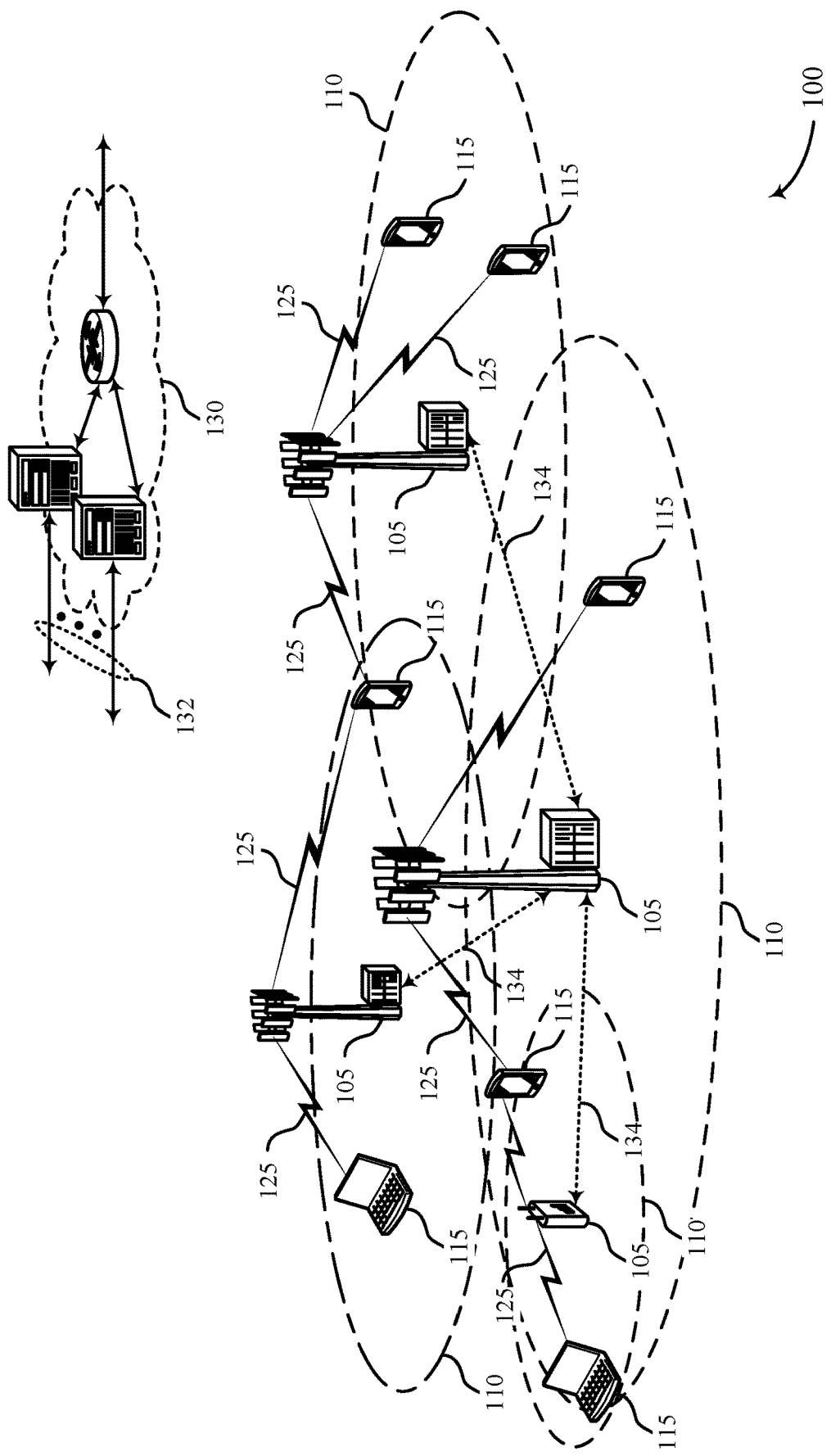
FIG. 1 illustrates an example of a wireless communications system that supports reference signal design in accordance with aspects of the present disclosure.

In some cases, a downlink reference signal such as a downlink channel state information reference signal (CSI-RS) or a downlink demodulation reference signal (DMRS) may need a larger coverage area. For example, a CSI-RS or a synchronization signal block (SSB) may be used as a positioning reference signal (PRS) by some user equipments (UEs). The downlink CSI-RS, when used as a PRS, may be configured to cover a larger area than the configured serving area for communication purposes. Additionally or alternatively, a dedicated PRS channel may be configured for this purpose. Further, a UE may also be configured to report CSI based on such a PRS channel.

In high frequencies (e.g., greater that 52.6 gigahertz (GHz)), CSI-RS may be associated with a larger path loss than at lower frequencies. Decreasing the peak-to-average power ratio (PAPR) of a reference signal may enable the base station to increase the transmit power for the reference signal. Thus, the base station transmitting the reference signal may transmit the reference signal with a higher average power. Specifically, for a same peak transmit power, a reference signal with a lower PAPR sequence may have a higher average transmit power than a reference signal with a higher PAPR sequence. Further, based on the higher average transmit power, the coverage area of the reference signal (e.g., CSI-RS, SSB, or PRS) may also be enhanced and extended when the reference signal is modulated using a $$\frac{\pi}{2}$$

binary phase shift keying (BPSK) modulation scheme because a $$\frac{\pi}{2}$$

BPSK modulation scheme may be associated with a low PAPR.

To utilize a $$\frac{\pi}{2}$$

BPSK modulation scheme for the transmission of a reference signal (e.g., a CSI-RS), the properties of the $$\frac{\pi}{2}$$

BPSK modulation scheme may be evaluated in contrast to other types of modulation schemes, such as modulation schemes that use a frequency-domain Gold-sequence or a Zadoff-Chu (ZC) sequence.

The base station may apply a filter either in the time domain or the frequency domain to the transmitted reference signal to a achieve a low PAPR for the reference signal. For example, a filter may be selected from a set of possible filters for a desired parameter outcome. In some cases, a filter may be selected to achieve the lowest PAPR for a reference signal transmission. The $$\frac{\pi}{2}$$

BPSK modulation scheme with frequency domain spectral shaping (FDSS) and DFT-s-OFDM transmission and filtration scheme may result in a lower PAPR than the PAPR resulting from other transmission schemes, such as quadrature phase shift keying (QPSK) with Cyclic-Prefix Orthogonal Frequency Division Multiplexing (CP-OFDM), QPSK with discrete Fourier transform (DFT) spread OFDM (DFT-s-OFDM), $$\frac{\pi}{2}$$

BPSK with DFT-s-OFDM, ZC sequence, ZC sequence with FDSS, or other options. In some cases, the base station may communicate the filter coefficients for the filtering process to the UE to assist in channel quality reporting.

Aspects of the disclosure are initially described in the context of a wireless communications system. Aspects are then described with respect to a block diagram and a process flow. Aspects of the disclosure are further illustrated by and described with reference to apparatus diagrams, system diagrams, and flowcharts that relate to reference signal design.

FIG. 1 illustrates an example of a wireless communications system 100 that supports reference signal design in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the CP, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The application of a $\frac{\pi}{2}$ BPSK sequence (e.g., a time-domain $\frac{\pi}{2}$ BPSK sequence) by a base station 105 to a reference signal may result in a non-flat frequency response. The non-flat frequency response may result in an impact to the accuracy of the CQI associated with the transmission of the CQI by the UE 115. The application of a filter (e.g., an FDSS) may change the frequency domain of the spectrum of the reference signal. A transparent filter may thus not be suitable because the UE 115 may not be aware of which filter coefficients were used by the base station, and the UE may not be able to decompose the frequency-domain pulse shaping from the frequency-domain channel coefficients. In some cases, a transparent filter may refer to cases where the receiver (e.g., the UE 115) of the signal is not aware of the parameters (e.g., filter coefficients) of the filter. In some cases, a non-transparent filter may refer to cases where the receiver (e.g., the UE 115) of the signal is aware of at least some parameters (e.g., filter coefficients) of the filter.

A base station 105 may apply a filter using a particular set of filter coefficients, and may transmit an indication of the filter coefficients to the UE 115. This transmission of filter coefficients may in some cases occur before the generation of the reference signals by the base station 105 and before the transmission of the reference signals by the base station 105 to the UE 115. Further, a UE 115 may interpret the quasi-collocation status of the downlink signals and determine the filter coefficients of the signals based on the quasi-collocation status.

In the frequency domain, the base station 105 may transmit a filtered signal, which may be received at the UE 115. The UE 115 may receive the filtered signal, as modified by channel gain, plus any noise introduced by the channel. The UE 115 may determine whether to report the CQI based on the un-filtered channel, or based on the filtered channel. In cases where the UE 115 determines to report the CQI based on the filtered channel, the UE may report the CQI of the received filtered subbands of the channel, or may report the CQI based on a hypothetical filtered subband channel, which may occur under the assumption that the filters are only applied to the subband in which the physical downlink shared channel (PDSCH) transmission may occur.

Figure 2:
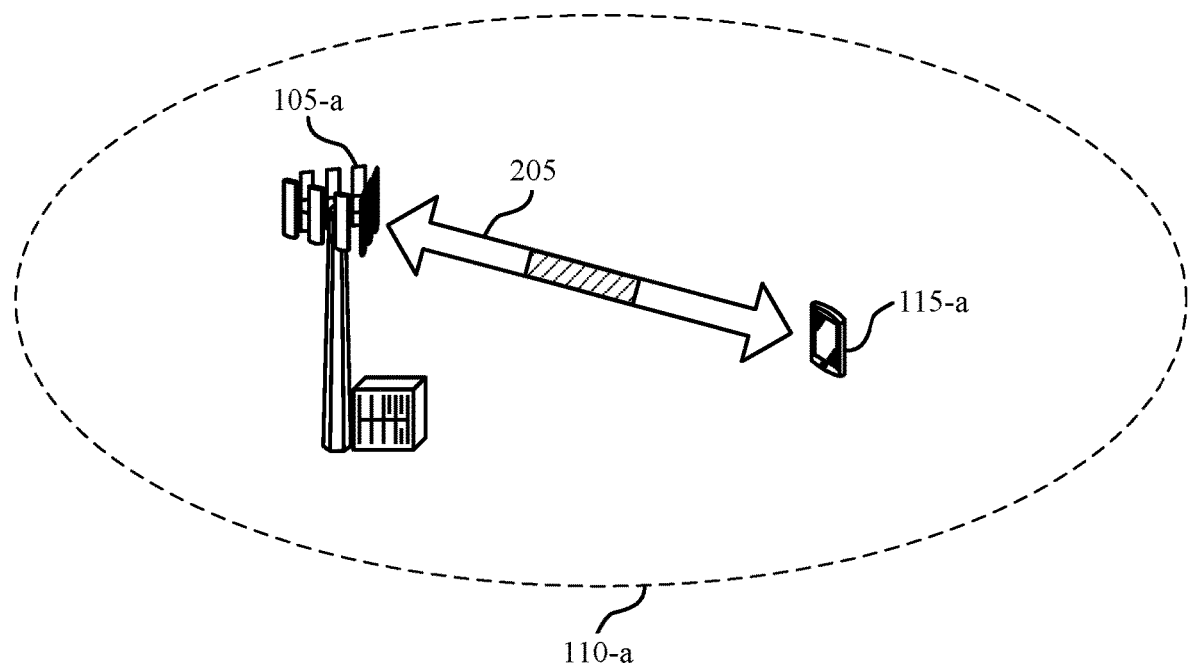
FIG. 2 illustrates an example of a wireless communications system that supports reference signal design in accordance with aspects of the present disclosure.
Figure 2:
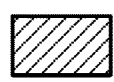

FIG. 2 illustrates an example of a wireless communications system 200 that supports reference signal design in accordance with aspects of the present disclosure. In some examples, wireless communications system 200 may implement aspects of wireless communications system 100. For example, base station 105-*a* and UE 115-*a* may communicate within a coverage area 110-*a*. Base station 105-*a* and UE 115-*a* may communicate over a transmission channel 205. Base station 105-*a* may transmit a reference signal to UE 115-*a* over transmission channel 205. In some cases, the reference signal 210 may be a CSI-RS.

Base station 105-*a* may transmit a downlink reference signal 210 as a PRS for UE 115-*a*. The downlink reference signal 210 as a PRS may be configured to cover a larger area than the serving area for communication purposes. At high frequencies (e.g., greater that 52.6 GHz), the reference signal 210 may be associated with a larger path loss than at lower frequencies. The reference signal 210 coverage may thus be enhanced by the use of a $\frac{\pi}{2}$ BPSK modulation scheme, for example because the $\frac{\pi}{2}$ BPSK modulation scheme may be associated with a low PAPR. A low PAPR may improve the coverage area of the reference signal because a low PAPR may allow base station 105-*a* to transmit with a higher power, which may enable the detection of the reference signal to occur over a larger area.

To use a $\frac{\pi}{2}$ BPSK modulation scheme (e.g., a time time-domain) on a reference signal (e.g., CSI-RS, DMRS, PRS, etc.), the properties of the $\frac{\pi}{2}$ BPSK modulation scheme may be configured to decrease PAPR and enhance the coverage area of a reference signal 210. For example, base station 105-*a* may determine filter coefficients associated with the $\frac{\pi}{2}$ BPSK modulation scheme and transmit the determined coefficients to UE 115-*a* over transmission channel 205. In other cases, the filter coefficients may be pre-configured for the UE 115-*a* or base station 105-*a*, for instance as part of a wireless communications standard.

The filter coefficients applied at base station 105-*a* and indicated to UE 115-*a* may be defined as time-domain coefficients or by frequency-domain coefficients. In some examples, the frequency-domain coefficients may be quantified into different frequency ranges. For example, a frequency range may be split up into five (5) smaller ranges of equal size, and each of the smaller ranges may correspond to a particular coefficient. In other example, different numbers of ranges, of equal or differing sizes, may be used.

The signals received by UE 115-*a* may be quasi-collocated under different types, for example where different types of quasi-collocation define different sets of quasi-collocation relationships. UE 115-*b* may interpret the filtered signals depending on what type the reference signals are quasi-collocated with. For example, the downlink signals may be quasi-collocated with a first type, which may mean that base station 105-*a* applied the same filter coefficients to both downlink signals. If the downlink signals are quasi-collocated with a different type, then base station 105-*a* may have applied different filter coefficients to the two downlink signal, or base station 105-*a* may have applied a filter coefficient to one downlink signal and may not have applied a filter coefficient to the second downlink signal. The second option of different filter coefficients may be used in situations where the downlink SSB is not filtered, the reference signal is filtered, and the reference signal and SSB are quasi-collocated.

UE 115-*a* may determine CQI for transmission channel 205 based on receiving the filter coefficients from base station 105-*a* and based on receiving the reference signal 210 over transmission channel 205. UE 115-*a* may also determine CQI based on the determined quasi-collocation type of the downlink signals received from base station 105-*a*. UE 115-*a* may determine whether to report the CQI based on the filtered channel or based on the un-filtered channel (e.g., by calculating the CQI for the channel after removing the filtering).

UE 115-*a* may feedback the CQI to base station 105-*b* by transmitting the CQI over transmission channel 205. Based on receiving the CQI, base station 105-*b* may transmit a PDSCH over transmission channel 205 and conduct further communications with one or more UEs 115.

Figure 3:
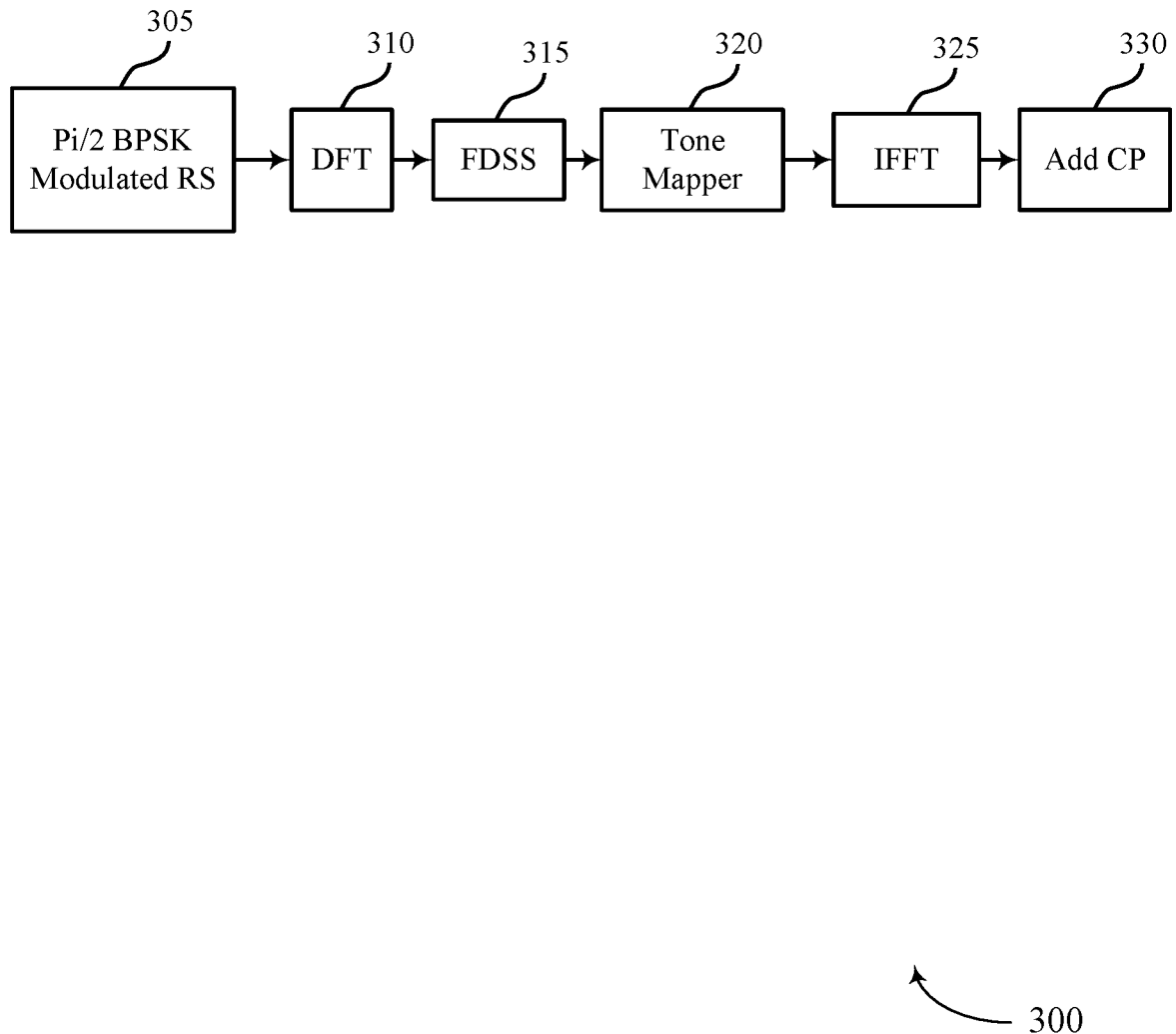
FIG. 3 illustrates an example of a block diagram that supports reference signal design in accordance with aspects of the present disclosure.

FIG. 3 illustrates an example of a block diagram 300 that supports reference signal design in accordance with aspects of the present disclosure. In some examples, the block diagram 300 may implements aspects of wireless communications systems 100 and 200. The block diagram 300 may illustrate a sequential filter in which subsequent functions as illustrated by blocks are applied to a signal before the signal is transmitted. For example, each component in the block diagram 300 may filter and change an initial reference signal so the it may be transmitted by a base station 105 to a UE 115 with a low PAPR, in order to enhance the coverage of the reference signal.

The first block in the block diagram 300 may be signal generator 305 configured to generate a reference signal modulated using a $\frac{\pi}{2}$ BPSK modulation scheme. The modulation of the reference signal using the $\frac{\pi}{2}$ BPSK modulation scheme may include a bit-mapping process, where each bit (e.g., b(i)) of the $\frac{\pi}{2}$ BPSK modulation scheme may be mapped to a complex-valued modulation symbol (e.g., d(i)) according to the following equation:

$$d(i) = \frac{e^{j\frac{\pi}{2}(i \bmod 2)}}{\sqrt{2}} [(1 - 2b(i)) + j(1 - 2b(i))] \quad (1)$$

A filter (e.g., a transparent filter, which may be either in the time domain or the frequency domain) may be applied to the reference signal transmitted by a base station 105 to achieve a low PAPR. For example, for a transmission scheme involving a format of 8 RBs, different filters may be applied which may lead to different PAPR levels, and filters may be combined in order to decrease the PAPR. For example, Table 1 below shows different transmission scheme filter combinations (e.g., QPSK with CP-OFDM or QPSK with DFT-s-OFDM) and the corresponding PAPR (as measured in decibels (dB)).

TABLE 1

| | | PAPR for Different Transmission Schemes | | | | |
|---|---|---|---|---|---|---|
| Transmission Scheme | QPSK with CP-OFDM | QPSK with DFT-s-OFDM | $\frac{\pi}{2}$ BPSK with DFT-s-OFDM | $\frac{\pi}{2}$ BPSK with FDSS and DFT-s-OFDM | ZC sequence | ZC sequence with FDSS |
| 8 RBs PAPR | 9.5 (dB) | 6.5 (dB) | 5.3 (dB) | 2 (dB) | 5.3 (dB) | 3.8 (dB) |

As shown in the Table 1, the transmission scheme with the lowest PAPR for these examples is $\frac{\pi}{2}$ BPSK with FDSS and DFT-s-OFDM. Thus, the next block in the block diagram 300 after the application of the $\frac{\pi}{2}$ BPSK modulation scheme may be DFT block 310.

After the DFT block 310, an FDSS block 315 may be applied to the signal. Then, a tone mapper 320 may be applied to the signal. After tone mapper 320, and inverse fast-Fourier transform (IFFT) block 325 may be applied to the reference signal, followed by the addition of the CP at block 330. After the addition of the CP at block 330, a base station 105 may transmit the filtered reference signal to a UE 115.

The $$\frac{\pi}{2}$$

BPSK modulation scheme (e.g., both filtered and non-filtered) may not create a flat or substantially flat frequency waveform for the signal it is applied to. A non-flat frequency may impact the CQI feedback. However, a transparent filter may not be suitable, as the UE 115 may not be aware of which filter coefficients are used. The UE 115 may therefore not be able to decompose the frequency-domain pulse shaping from the frequency domain channel coefficients. The UE not being able to decompose the domain pulse shaping may affect frequency selective scheduling and CQI feedback (e.g., for one or more subbands). The UE 115 may also infer some channel parameters for DMRS channel estimation from the corresponding channel parameters on the reference signal. The average delay spread may be different if other time-domain filters are used on the DMRS for the channel and used on the reference signal for the channel. To resolve at least some of these issues, different restrictions may be considered in the determination of the filters applied to the reference signal at a base station 105, and further CQI reporting methods may be determined for the transmission of the CQI by a UE 115 to a base station 105.

Figure 4:
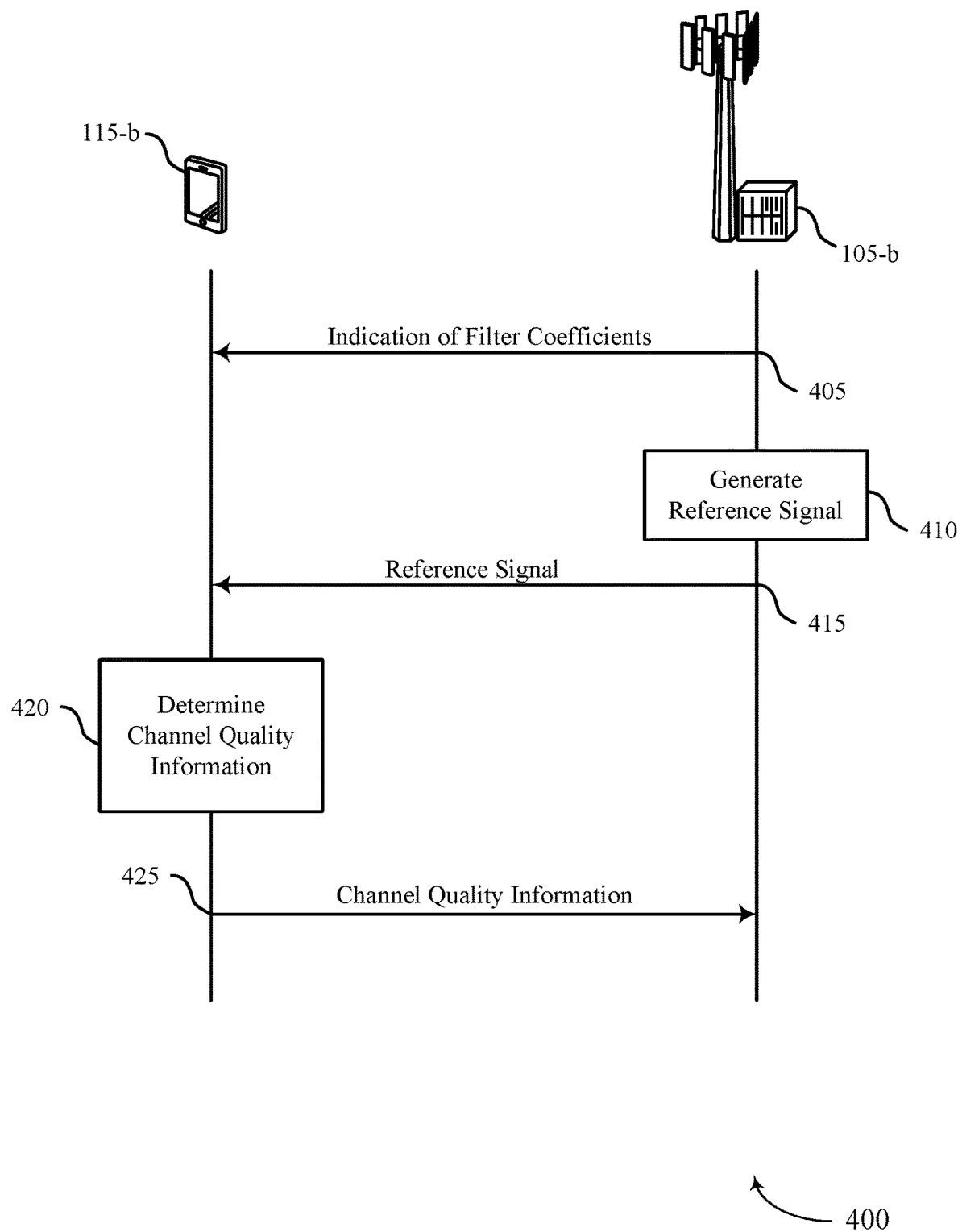
FIG. 4 illustrates an example of a process flow that supports reference signal design in accordance with aspects of the present disclosure.

FIG. 4 illustrates an example of a process flow 400 that supports reference signal design in accordance with aspects of the present disclosure. In some examples, process flow 400 may implement aspects of wireless communications systems 100 and 200. The process flow 400 may include UE 115-*b* and base station 105-*b*, which may be respective examples of a UE 115 and a base station 105 as described herein.

The filter coefficients associated with a filter that is applied at the transmitter (e.g., by base station 105-*b*) may be indicated to the UE 115-*b*. At 405, base station 105-*b* may transmit an indication of one or more filter coefficients used by base station 105-*b* to filter a reference signal used by UE 115-*b* to determine CQI. UE 115-*b* may receive an indication of the one or more filter coefficients used by base station 105-*b*. Base station 105-*b* may apply a filter that uses one or more of the filter coefficients to the reference signal, and may generate the reference signal at 410 based on applying the filter. Base station 105-*b* may also identify a type of the reference signal (e.g., DMRS, CSI-RS, PRS, etc.) and the one or more filter coefficients applied by the base station 105-*b* may be based on the type of the reference signal. The one or more filter coefficients may be included in the indication of the filter configuration. The one or more filter coefficients or the shape of the filter using a set of filter coefficients may be based on a bandwidth associated with the filter. In some cases, the shape of a filter using a first set of filter coefficients may vary based on the bandwidth of the filter, the number of configured RBs, the placement of the RBs within the bandwidth, the spectrum shape of the frequency response of the filter, other parameters, or combinations thereof. For example, if a filter includes a given shape over eight RBs, then later the configuration of the transmitter is changed to transmit four RBs of these 8 RB, the shape of the filter over those four RBs may not be the same as it was for the eight RB transmission. In such examples, the same set of filter coefficients may produce different filtering results based on the bandwidth.

UE 115-*b* may receive, from base station 105-*b*, an indication of the filtering configuration applied to the reference signal. UE 115-*b* may identify one or more parameters (e.g., filter coefficients or other filter characteristics) of the downlink channel configuration, where identifying the filtering configuration may be based on identifying one or more parameters of the downlink channel configuration.

The filter coefficients may be configured by base station 105-*b* and indicated to UE 115-*b* via RRC signaling transmitted from base station 105-*b* to UE 115-*b*. In such cases, the base station 105-*b* may have flexibility to select filter coefficients based on different network conditions, as base station 105-*b* may notify UE 115-*b* via RRC signaling when the filter coefficients change or may notify the UE 115-*b* of the new filter coefficients. The configuration of the filter coefficients may be conditional based on the particular type of eference signal, CSI-RS, PRS, or DMRS being utilized (e.g., whether a $$\frac{\pi}{2}$$

BPSK sequence or a ZC sequence used for the reference signal). In other cases, the filter coefficients could be configured statically (e.g., based on a pre-configuration or a wireless communications standard).

Base station 105-*b* may identify one or more time-domain filter coefficients, where the one or more filter coefficients may include one or more time domain filter coefficients. For example, the sequence −0.28, 1, 0.28 may indicate a 3-tap time-domain filter with filter coefficients of −0.28, 1, −0.28.

In other cases, base station 105-*b* may identify one or more frequency-domain coefficients, where the one or more filter coefficients include one or more frequency-domain filter coefficients. The frequency response of a filter may generally approximate a specific spectrum shape over a given range of frequencies (e.g., the bandwidth of the filter). The filter-coefficients may be configured to approximate the desired frequency response of the filter. Further, filter coefficients may be a function of the bandwidth allocation. For example, the specific spectrum shape may be a first shape for eight RBs. The configuration may be changed to transmit on the middle four blocks of the eight RBs, and thus the shape over the four RBs may be different than the shape over the eight RBs. The one or more filter coefficients may be associated with a set of frequency ranges. For example, the frequency range 0 to f/5 may be a first filter coefficient that may correspond to a multiplier of one, the frequency range f/5 to 2f/5 may correspond to a second filter coefficient, the frequency range 2f/5 to 3f/5 may correspond to a third filter coefficient. In some cases, f may refer to a total frequency bandwidth of the filter.

At 410, base station 105-*b* may generate one or more reference signals based on the one or more filter coefficients. In an NR wireless communications system, two downlink signals (including a reference signal) may be quasi-collocated under different types of parameters. A first type, Type A, may correspond to Doppler shift, Doppler spread, average delay, and delay spread. A second type, Type B, may correspond to doppler shift and doppler spread. A third type, Type C, may correspond to doppler shift and average delay. A fourth type, Type D, may correspond to spatial receive parameters (e.g., beams). Base station 105-*b* may determine that the reference signal and the second signal are quasi-collocated, and may associate one or more of the filter coefficients of the reference signal with the second signal based on the reference signal and the second signal being quasi-collocated under different types. Base station 105-*b* may determine the type of quasi-collocation of the reference signal and the second signal, and may filter the reference signal based on the type of quasi-collocation. Base station 105-*b* may in some cases refrain from filtering the second signal based on the type of quasi-collocation.

At 415, base station 105-*b* may transmit the one or more reference signals to UE 115-*b*. UE 115-*b* may receive the reference signal from base station 105-*b*. Base station 105-*b* may modulate the reference signal using a $$\frac{\pi}{2}$$

BPSK modulation scheme, and base station 105-*b* may transmit the reference signal based on modulating the reference signal using the $$\frac{\pi}{2}$$

BPSK modulation scheme. In some cases, base station 105-*b* may transmit an unfiltered reference signal (e.g., a CSI-RS) where the first PAPR of the filtered reference signal may be less than the second PAPR of the unfiltered reference signal. In these cases, at 415 UE 115-*b* may receive an unfiltered reference signal (e.g., a CSI-RS) from the base station, where the first PAPR of the filtered reference signal is less than the second PAPR of the unfiltered reference signal.

The base station 105-*b* may transmit one or more reference signals with filter coefficients. Base station 105-*b* may identify a filtering configuration associated with the reference signal where the one or more filter coefficients are based on the filtering configuration, and base station 105-*b* may apply a filter to the reference signal that uses the one or more filter coefficients. The transmission of the reference signal by base station 105-*b* may be based on applying the filter. UE 115-*b* may determine that the reference signal and a second signal are quasi-collocated, where one or more filter coefficients associated with the second signal are the same filter coefficients as the one or more filter coefficients applied to the first signal.

The two transmitted downlink signals may be a combination of reference signals, for example CSI-RS and DMRS, CSI-RS and CSI-RS, or CSI-RS and SSB. Other combinations of signals may include a PRS. Whether the two downlink signals have the same filter coefficients may depend on the quasi-collocation type. UE 115-*b* may determine the type of quasi-collocation of the reference signal and the second signal, where the one or more filter coefficients associated with the reference signal and one or more filter coefficients associated with the second signal are based on the type of quasi-collocation. For example, if the two downlink signals are quasi-collocated with Type A or Type C, then the same filtering coefficients may be applied. In other cases, different filters may be applied if the two downlink reference signals are quasi-collocated with Type B or Type D. In some cases, UE 115-*b* may determine a type of quasi-collocation of the reference signal and the second signal, where the second signal is not filtered based on the type of quasi-collocation. In the case of different filters, one signal may have a filter applied and the second signal may have a different filter, or no filter. In some cases, the applied filter may include an FDSS filter.

The UE 115-*b* may determine, based on determining the first filter coefficients and the second filter coefficients at 405, third filter coefficients for a third filter associated with the first subband and fourth filter coefficients associated with the second subband. UE 115-*b* may receive a downlink signal, and UE 115-*b* may apply the third filter to the first subband of the downlink signal and the fourth filter to the second subband of the downlink signal.

The reference signal may be modulated using a $$\frac{\pi}{2}$$

BPSK modulation scheme. In some cases, two downlink signals with one or more filters may be qualified as "QCLed modulo filter," which may indicate that the two signals are quasi-collocated once the differences in the filters are accounted for. One of the signals may be a reference signal, which may include a CSI-RS. The filter coefficients in this case may be known to the base station and the UE. The system of "QCLed modulo filter" may be utilized in cases where the downlink SSB is not filtered but the CSI-RS is filtered, or in cases where the CSI-RS and SSB are quasi-collocated, or both. In some cases, after UE 115-*b* removes the filter applied to the CSI-RS, the CSI-RS and the SSB may be "QCLed modulo filter" based on both the CSI-RS and the SSB being unfiltered. In some cases, the UE 115-*b* may determine whether two signals are quasi-collocated after filtering all of the signals (e.g., QCLed modulo filter situation), after filtering some but not all of the signals, or without filtering any of the signals.

A transmitted reference signal may be defined as F×s, where F is one or more filter coefficients and s is the un-filtered reference signal (e.g., an unfiltered CSI-RS). The reference signal received by UE 115-*b* may be defined as H×F×s+noise, where F×s is the transmitted reference signal (with a filter), H is the channel gain as received by UE 115-*b*, and noise may also be included in the reference signal as received by the UE.

At 420, UE 115-*b* may determine the CQI based on the received reference signal and the one or more filter coefficients. UE 115-*b* may identify a filtering configuration applied to the reference signal, identify a filter to apply to the reference signal based on identifying the filtering configuration, and may apply the filter to the reference signal. The determination of the CQI may be based on applying the filter. The UE 115-*b* may apply a filter to the received reference signal using the one or more filter coefficients.

The UE 115-*b* may measure channel quality, and may determine whether to measure the channel quality both of H×F, which may be the channel with filtering, or the channel H without filtering. In some cases, UE 115-*b* may be configured to report channel quality for the unfiltered channel H, rather that H×F. In order for UE 115-*b* to measure the channel quality of H without the filter coefficient F, UE 115-*b* may remove the filter from the signal. Reporting the channel quality for the unfiltered channel H may be beneficial in cases where base station 105-*b* may schedule PDSCH transmissions that do not use filters (e.g., a signal including QPSK modulation, or an SSB). Thus, UE 115-*b* and base station 105-*b* may accurately determine the channel quality based on a non-filtered channel, so that the device may accurately determine the quality of non-filtered transmissions within the non-filtered channel.

In some cases, UE 115-*b* may be configured to report the channel quality of the filtered channel. In these cases, UE 115-*b* may be configured to report channel quality of wideband CQI or subband CQI, or both. In some cases, wideband CQI may refer to determining CQI for an entire bandwidth of the reference signal or the entire bandwidth of the filter applied to the reference signal. In some cases, the subband CQI may refer to determining CQI for some sub-bandwidth of the reference signal or filter that is not the entire bandwidth of the reference signal or the filter. In cases where UE 115-*b* is be configured to report channel quality using wideband CQI, UE 115-*b* may report the quality of the filtered (e.g., H×F) wideband channel rather than the channel without the filter.

In cases where UE 115-*b* is configured to report the subband CQI, UE 115-*b* may have different options for channel quality reporting. In the case of downlink transmission with DFT-s-OFDM waveforms, the number of RBs for the resource allocation of CSI-RS and PDSCH may be in the form $2^j 3^i 5^k$, and thus the number of subbands for CQI transmission may also be in the form $2^j 3^i 5^k$. In a frequency domain with multiple subbands, UE 115-*b* may detect a channel defined in terms of reference signals for the one or more subbands. For example, in a frequency domain with two subbands, UE 115-*b* may detect a channel that may be defined as the combination of a first reference signal Y(1)=H(1)×F(1)×s(1)+noise for the first subband and a second reference signal Y(2)=H(2)×F(2)×s(2)+noise for the second subband. The filter coefficients for each of the subbands may be indicated together by base station 105-*b* to UE 115-*b* as one coefficient, which may be defined as F=[F(1), F(2)], where F(1) is the filtering coefficient applied to the first reference signal s(1) on the first subband and F(2) is the filtering coefficient applied to the second reference signal s(2) on the second subband.

In cases where UE 115-*b* is configured to report channel quality of the filtered channel, UE 115-*b* may report the quality of the two received filtered subband channels as H(1)×F(1) and H(2)×F(2). In this report, H(1) may be defined as the first unfiltered channel for the first subband, F(1) may be defined as the first filtering coefficient for the first subband, H(2) may be defined as the second unfiltered channel for the second subband, and F(2) may be defined as the second filtering coefficient for the second subband.

In cases where the UE 115-*b* is configured to report the channel quality based on a hypothetical filtered subband channel, H(1)×A(1) and H(2)×A(2), where A(1) and A(2) are the frequency domain filter coefficients in a hypothetical situation where the frequency domain filter coefficients are applied to each of the subbands separately. When UE 115-*b* transmits the CQI measurement to base station 105-*b* at 425, UE 115-*b* may conduct the measurement and transmission of the CQI of one of the hypothetical filtered subbands (e.g., H(1)×A(1) or H(2)×A(2)) based on the assumption that the PDSCH transmission may occur in one of those subbands, or a determination that the PDSCH transmission may occur in one of those subbands based on control information (e.g., a DCI) received from base station 105-*b*. In the case where the bandwidth of the subbands are the same, A(1) may be equal to A(2).

At 425, UE 115-*b* may transmit the determined CQI to base station 105-*b*. For example, the CQI may be transmitted by UE 115-*b* to base station 105-*b* in a report of CSI, such as a CSI report. The report may include additional information such as one or more of a rank indicator or precoding matrix indicator. Base station 105-*b* may receive the CQI in response by UE 115-*b* to the transmitted reference signal.

In some cases, base station 105-*b* may transmit the reference signal (e.g., CSI-RS) at 415 in a channel with a larger bandwidth, but may also configure UE 115-*b* to transmit CQI in a channel with a smaller bandwidth (e.g., in the UE bandwidth part). In this case, UE 115-*b* may receive the reference signal (e.g., CSI-RS) in the larger bandwidth, and may then report the CQI on the assumption of a narrowband filter at 425.

For example, UE 115-*b* may report the CQI at 425 for a hypothetical filtered narrowband channel, where the filter coefficients that the UE 115-*b* applies may correspond to the narrowband channel. The report of the CQI for the narrowband may be based on the assumption that the transmission of the PDSCH may occur in the narrowband channel, and that the transmission of the PDSCH may occur with the filter coefficients corresponding to the narrowband channel.

UE 115-*b* may in some cases may be configured to select a CQI process based on a particular option. UE 115-*b* may be configured with multiple different CSI report processes. One of the multiple CSI report processes may include the configuration to report the CQI for the filtered channel, and another of the multiple CSI report processes may include the configuration to report the CQI for the unfiltered channel. For example, UE 115-*b* may be configured to report the CQI at 425 of the filtered subband channel, or may be configured to report the CQI at 425 based on the hypothetical subband channel. In other cases, UE 115-*b* may select which CQI transmission option to use based on other parameters of CSI reporting or parameters of the PDSCH configuration. These parameters may include the PDSCH waveform type (e.g., DFT-s or CP-OFDM), the number of reference signal (e.g., CSI-RS) ports, the bandwidth of the reference signal (e.g., CSI-RS), or other parameters. In some cases, the first bandwidth of the received reference signal may be different than a second bandwidth associated with the CQI information transmitted by UE 115-*b* to base station 105-*b*.

When the $$\frac{\pi}{2}$$

BPSK modulation scheme is used for the transmission of the reference signal (e.g., CSI-RS), the number of combs may be limited to 2 or 4, rather than 6 or 12, or other limits. This may be because the larger number of combs may correspond to an increase in the PAPR. Further, since the $$\frac{\pi}{2}$$

Figure 5:
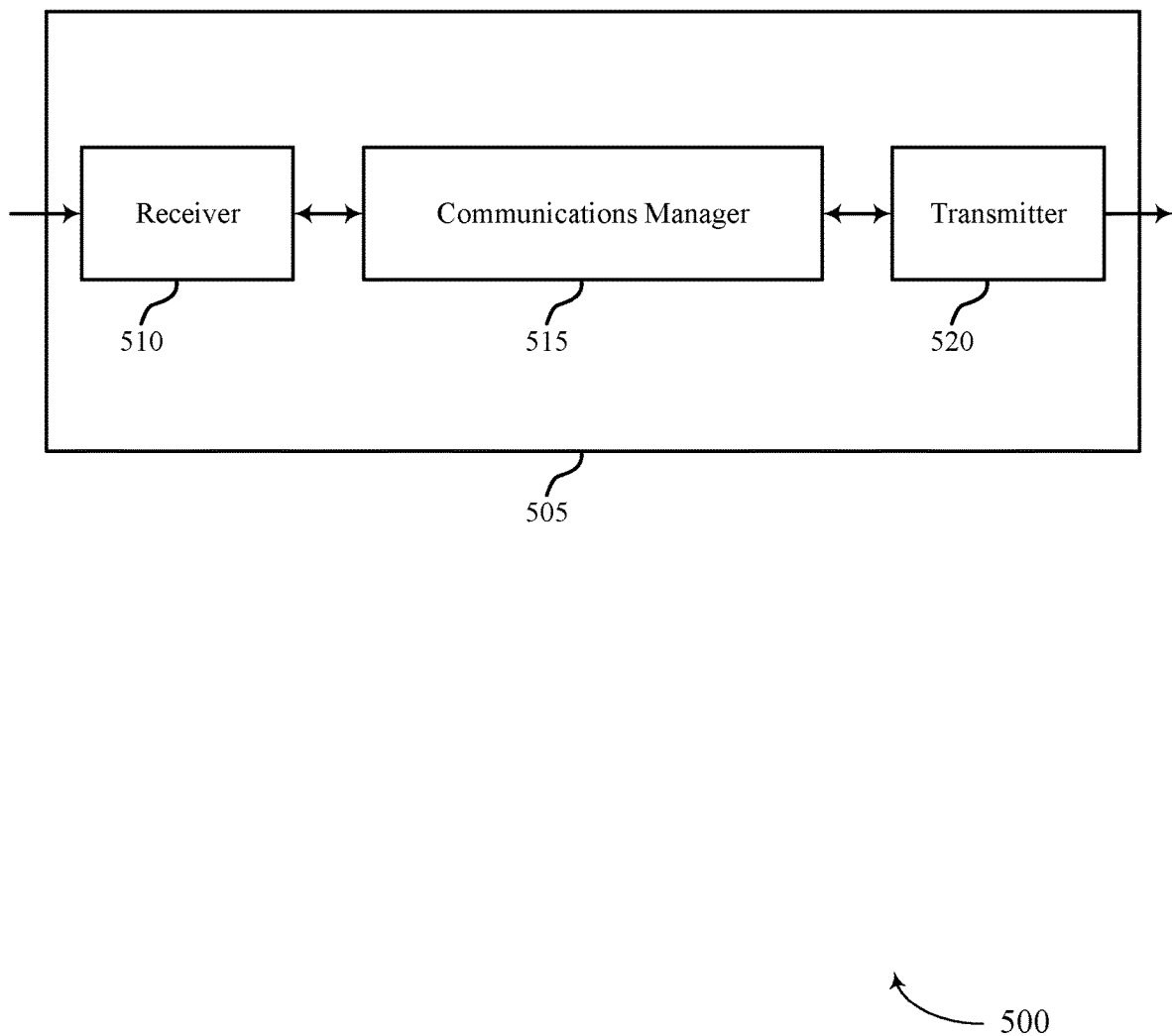
FIGS. 5 and 6 show block diagrams of devices that support reference signal design in accordance with aspects of the present disclosure.

BPSK sequence reverence signal frequency response is not flat in the frequency domain, UE 115-*b* may determine the channel quality by measuring the channel quality and average the results over more frequency domain tones. This averaging of the channel quality measurement over more tones may improve the estimation of the channel quality FIG. 5 shows a block diagram 500 of a device 505 that supports reference signal design in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal design, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an indication of one or more filter coefficients used by a base station to filter a reference signal used by the UE to determine CQI, receive the reference signal from the base station, determine the CQI based on the received reference signal and the one or more filter coefficients, and transmit the determined CQI to the base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. One implementation may allow a UE to receive a CSI-RS from a base station 105 from a further distance, as the reference signal design as described herein may decrease the PAPR of the CSI-RS and therefore enable the base station 105 to transmit the CSI-RS with a higher average transmit power which may increase the potential coverage area of the CSI-RS. Another implementation may also improve the usefulness of the CQI transmitted by the UE 115, as the UE 115 may determine whether to transmit the filtered or unfiltered CQI based on information received from a base station 105.

Figure 6:
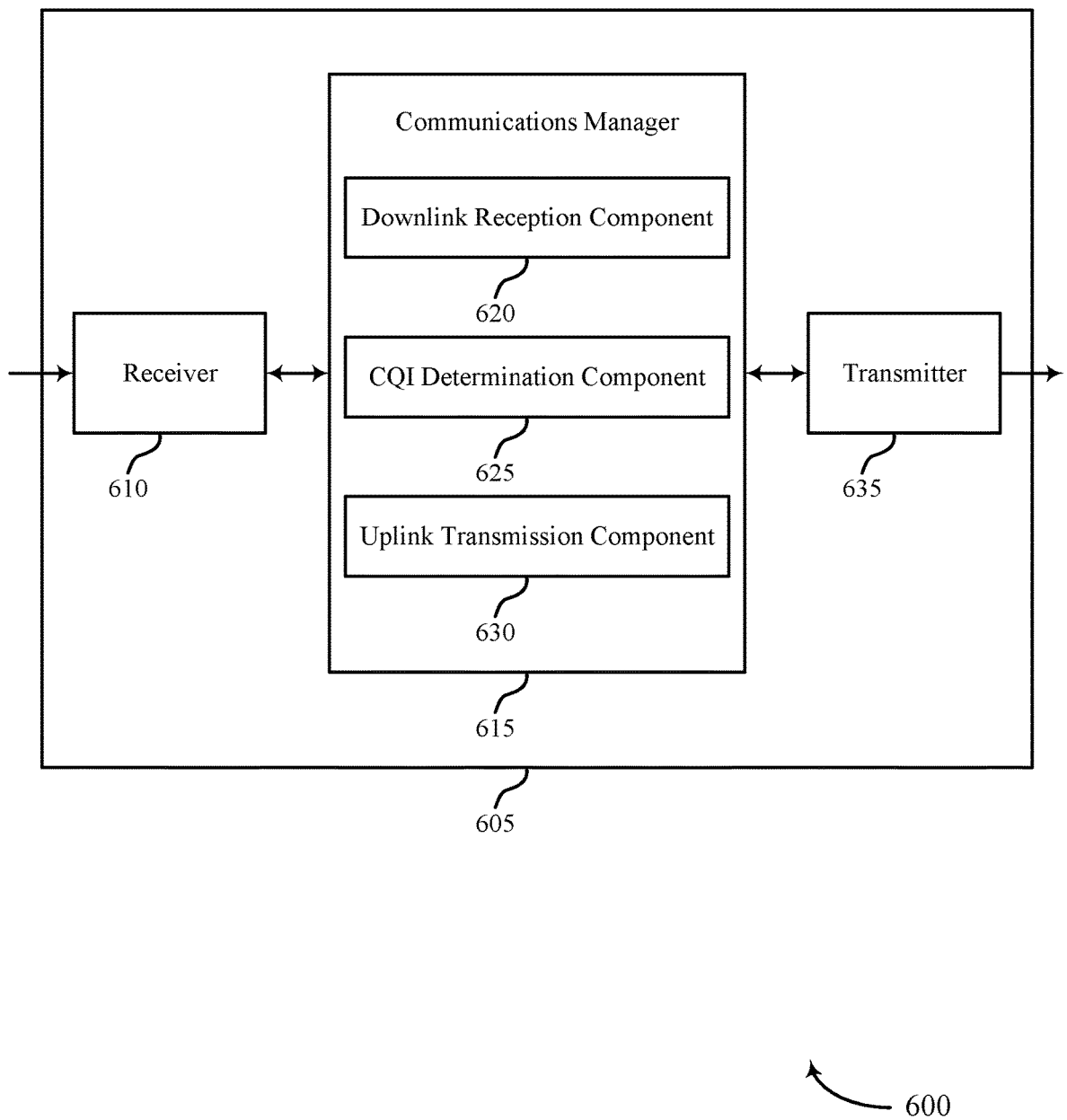

FIG. 6 shows a block diagram 600 of a device 605 that supports reference signal design in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to reference signal design, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a downlink reception component 620, a CQI determination component 625, and an uplink transmission component 630. The communications manager 615 may be an example of aspects of the communications manager 810 described herein.

The downlink reception component 620 may receive an indication of one or more filter coefficients used by a base station to filter a reference signal used by the UE to determine CQI and receive the reference signal from the base station.

The CQI determination component 625 may determine the CQI based on the received reference signal and the one or more filter coefficients. The uplink transmission component 630 may transmit the determined CQI to the base station.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
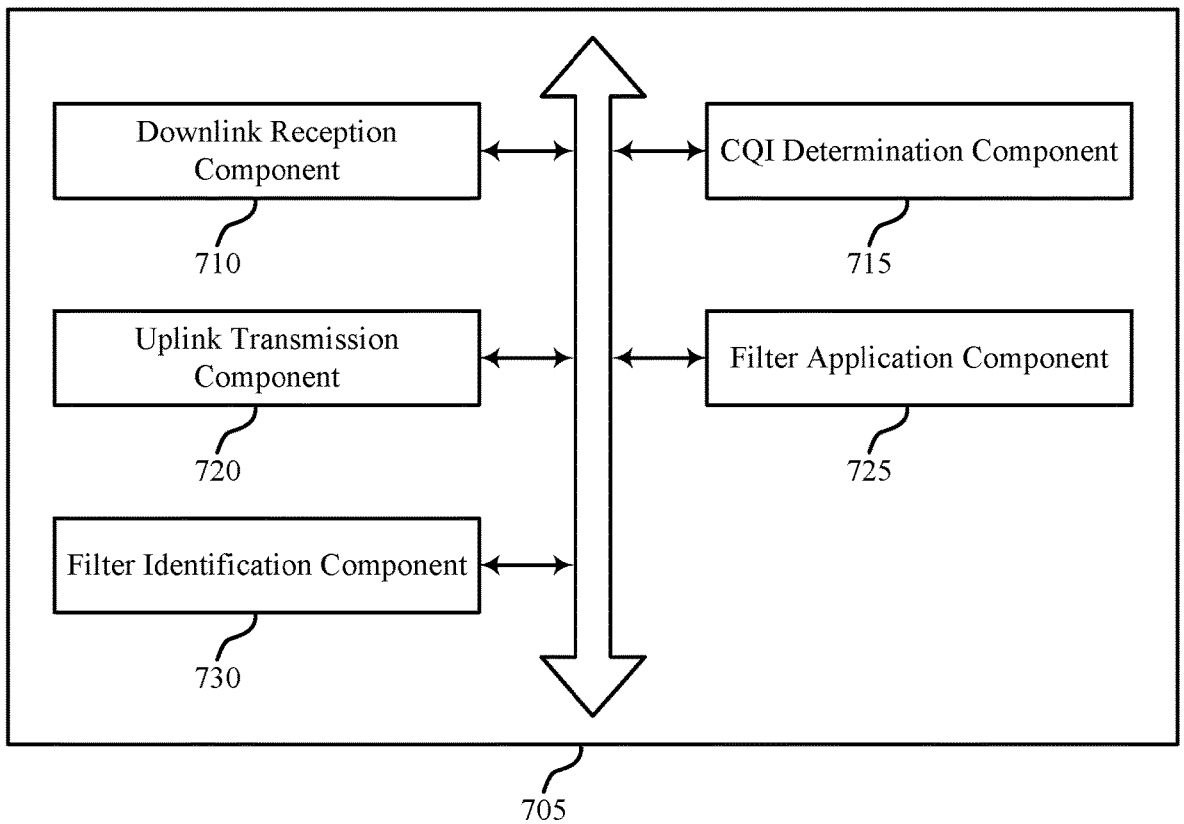
FIG. 7 shows a block diagram of a communications manager that supports reference signal design in accordance with aspects of the present disclosure.

FIG. 7 shows a block diagram 700 of a communications manager 705 that supports reference signal design in accordance with aspects of the present disclosure. The communications manager 705 may be an example of aspects of a communications manager 515, a communications manager 615, or a communications manager 810 described herein. The communications manager 705 may include a downlink reception component 710, a CQI determination component 715, an uplink transmission component 720, a filter application component 725, and a filter identification component 730. Each of these modules may communicate, directly or indirectly, with one another (e.g., via one or more buses).

The downlink reception component 710 may receive an indication of one or more filter coefficients used by a base station to filter a reference signal used by the UE to determine CQI. In some examples, the downlink reception component 710 may receive the reference signal from the base station. In some examples, the downlink reception component 710 may receive a downlink signal. In some examples, the downlink reception component 710 may receive, from the base station, an indication of the filtering configuration applied to the reference signal, where identifying the filtering configuration is based on the received indication of the filtering configuration. In some examples, the downlink reception component 710 may receive an unfiltered reference signal from the base station, where a first peak to average power ratio of the filtered reference signal is less than a second peak to average power ratio of the unfiltered reference signal.

The CQI determination component 715 may determine the CQI based on the received reference signal and the one or more filter coefficients.

The uplink transmission component 720 may transmit the determined CQI to the base station.

The filter application component 725 may apply a filter to the received reference signal using the one or more filter coefficients, where determining the CQI is based on applying the filter to the reference signal. In some examples, the filter application component 725 may apply the first filter to the first subband of the reference signal and the second filter to the second subband of the reference signal, where determining the CQI is based on applying the first filter and the second filter.

In some examples, the filter application component 725 may apply the third filter to the first subband of the downlink signal and the fourth filter to the second subband of the downlink signal. In some examples, the filter application component 725 may apply the filter to the reference signal, where determining the CQI is based on applying the filter.

The filter identification component 730 may determine first filter coefficients for a first filter associated with a first subband of the reference signal and second filter coefficients for a second filter associated with a second subband of the reference signal. In some examples, the filter identification component 730 may determine, based on determining the first filter coefficients and the second filter coefficients, third filter coefficients for a third filter associated with the first subband and fourth filter coefficients for a fourth filter associated with the second subband. In some examples, the filter identification component 730 may determine that a first bandwidth of the first subband is equal to a second bandwidth of the second subband, where the first filter coefficients are a same set of filter coefficients as the second filter coefficients based on the first bandwidth equaling the second bandwidth. In some examples, the filter identification component 730 may identify a filtering configuration applied to the reference signal. In some examples, the filter identification component 730 may identify a filter to apply to the reference signal based on identifying the filtering configuration.

In some examples, the filter identification component 730 may identify one or more parameters of a downlink channel configuration, where identifying the filtering configuration is based on identifying the one or more parameters of the downlink channel configuration. In some examples, the filter identification component 730 may determine that the reference signal and a second signal are quasi-collocated, where one or more filter coefficients associated with the second signal are a same set of filter coefficients as the one or more filter coefficients associated with the reference signal. In some examples, the filter identification component 730 may determine a type of quasi-collocation of the reference signal and a second signal, where the one or more filter coefficients associated with the reference signal and one or more filter coefficients associated with the second signal are based on the type of quasi-collocation. In some examples, the filter identification component 730 may determine a type of quasi-collocation of the reference signal and a second signal, where the second signal is unfiltered based on the type of quasi-collocation.

Figure 8:
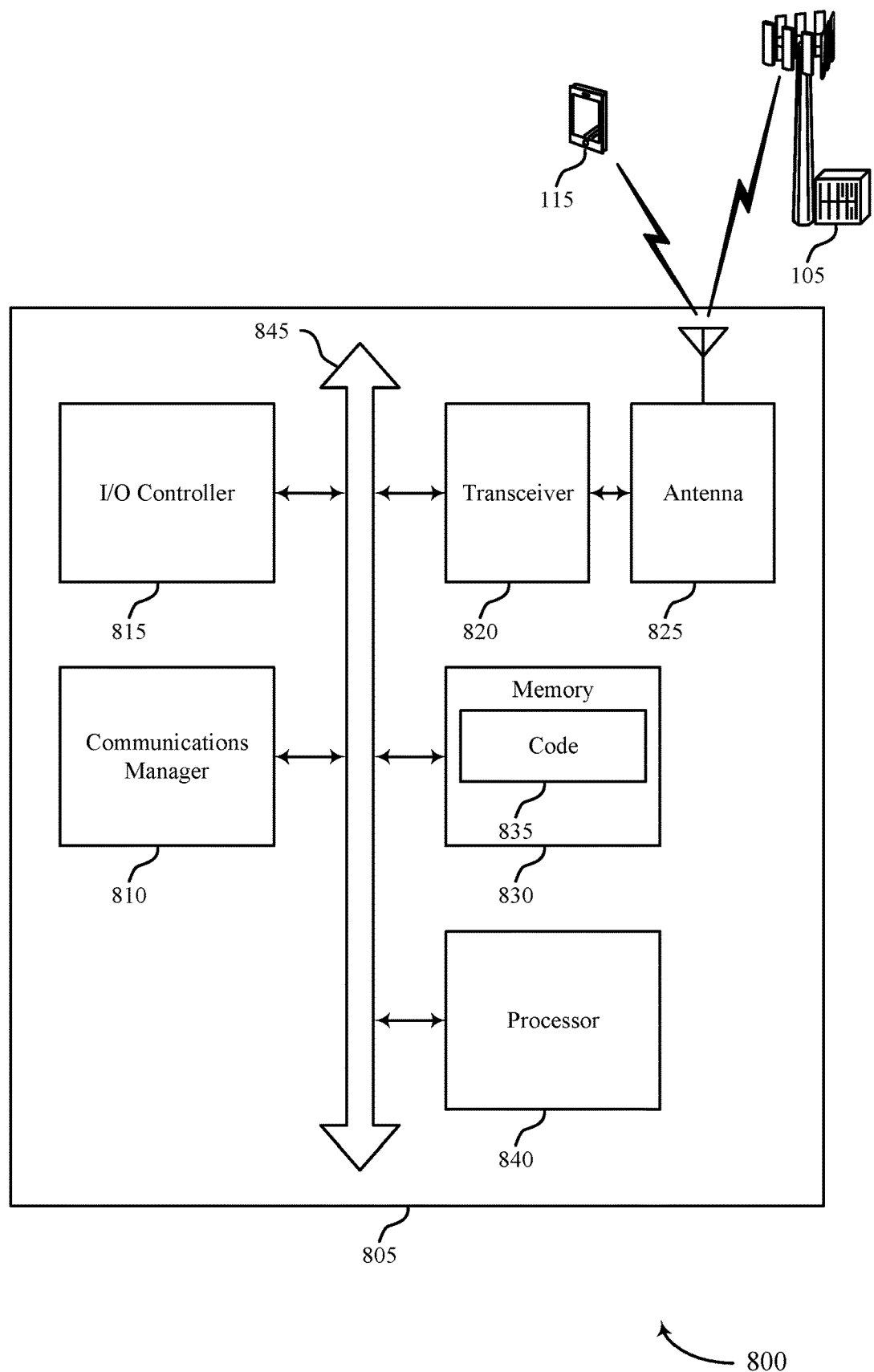
FIG. 8 shows a diagram of a system including a device that supports reference signal design in accordance with aspects of the present disclosure.

FIG. 8 shows a diagram of a system 800 including a device 805 that supports reference signal design in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an indication of one or more filter coefficients used by a base station to filter a reference signal used by the UE to determine CQI, receive the reference signal from the base station, determine the CQI based on the received reference signal and the one or more filter coefficients, and transmit the determined CQI to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal design).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
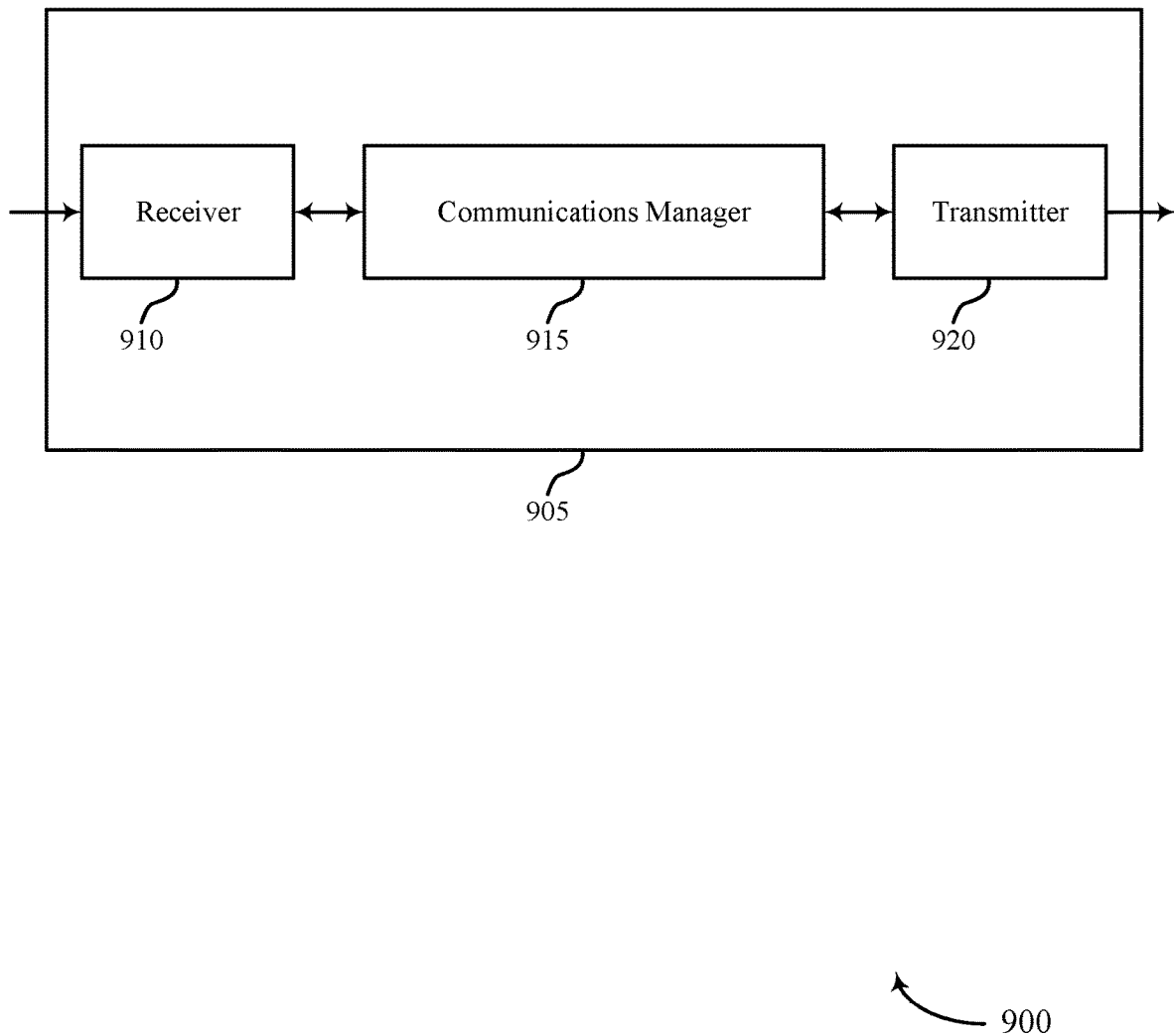
FIGS. 9 and 10 show block diagrams of devices that support reference signal design in accordance with aspects of the present disclosure.

FIG. 9 shows a block diagram 900 of a device 905 that supports reference signal design in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal design, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit an indication of one or more filter coefficients used by the base station to filter a reference signal used by a UE to determine CQI, transmit the reference signal to the UE, generate the reference signal based on the one or more filter coefficients, and receive, from the UE, the CQI at least in part in response to the transmitted reference signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Based on receiving an indication of one or more filter coefficients used by a base station 105 to filter a reference signal used by a UE 115, a processor of a UE 115 (e.g., the receiver 910 or the transmitter 920 as described herein) may improve the determination of the CQI before transmitting the CQI to the base station 105. The processor of the UE 115 may receive a higher quality reference signal from base station 105 based on the lower PAPR of the reference signal, and the processor of the UE 115 may transmit a CQI based on a filtered or nonfiltered CQI measurement as determined based on the reference signal and filter coefficients received from the base station 105.

Figure 10:
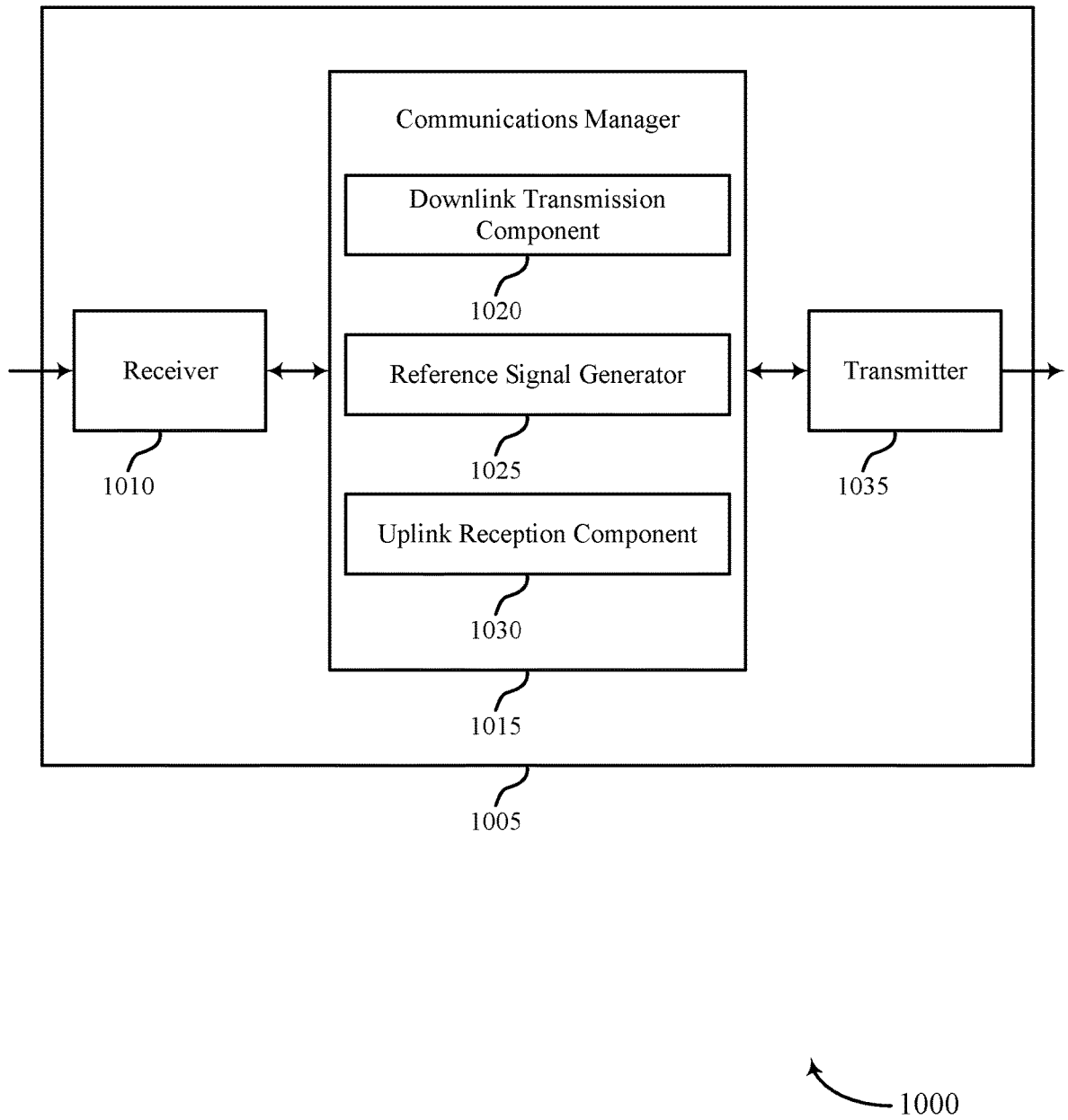

FIG. 10 shows a block diagram 1000 of a device 1005 that supports reference signal design in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal design, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a downlink transmission component 1020, a reference signal generator 1025, and an uplink reception component 1030. The communications manager 1015 may be an example of aspects of the communications manager 1210 described herein.

The downlink transmission component 1020 may transmit an indication of one or more filter coefficients used by the base station to filter a reference signal used by a UE to determine CQI and transmit the reference signal to the UE.

The reference signal generator 1025 may generate the reference signal based on the one or more filter coefficients.

The uplink reception component 1030 may receive, from the UE, the CQI at least in part in response to the transmitted reference signal.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
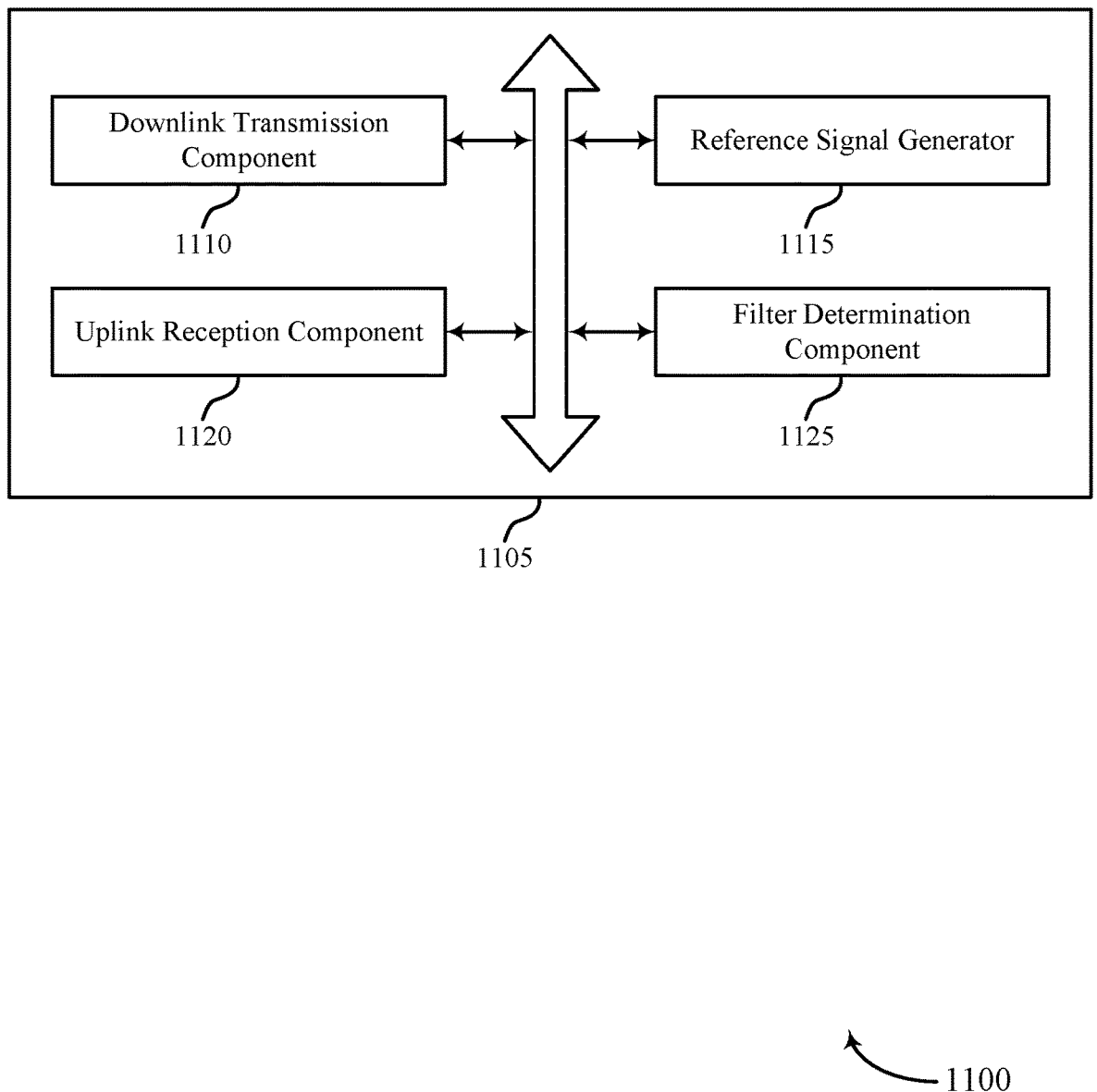
FIG. 11 shows a block diagram of a communications manager that supports reference signal design in accordance with aspects of the present disclosure.

FIG. 11 shows a block diagram 1100 of a communications manager 1105 that supports reference signal design in accordance with aspects of the present disclosure. The communications manager 1105 may be an example of aspects of a communications manager 915, a communications manager 1015, or a communications manager 1210 described herein. The communications manager 1105 may include a downlink transmission component 1110, a reference signal generator 1115, an uplink reception component 1120, and a filter determination component 1125. Each of these modules may communicate, directly or indirectly, with one another (e.g., via one or more buses).

The downlink transmission component 1110 may transmit an indication of one or more filter coefficients used by the base station to filter a reference signal used by a UE to determine CQI. In some examples, the downlink transmission component 1110 may transmit the reference signal to the UE. In some examples, the downlink transmission component 1110 may transmit an indication of the filtering configuration to the UE, where transmitting the one or more filter coefficients is based on transmitting the indication of the filter configuration. In some examples, the downlink transmission component 1110 may transmit an unfiltered reference signal to the UE, where a first peak to average power ratio of the filtered reference signal is less than a second peak to average power ratio of the unfiltered reference signal.

The reference signal generator 1115 may generate the reference signal based on the one or more filter coefficients. In some examples, the reference signal generator 1115 may identify a type of the reference signal, where the one or more filter coefficients are based on the type of the reference signal. In some examples, the reference signal generator 1115 may modulate the reference signal using a $$\frac{\pi}{2}$$

BPSK modulation scheme, where transmitting the reference signal is based on modulating the reference signal using the $$\frac{\pi}{2}$$

BPSK modulation scheme.

The uplink reception component 1120 may receive, from the UE, the CQI at least in part in response to the transmitted reference signal.

The filter determination component 1125 may apply a filter that uses the one or more filter coefficients to the reference signal, where generating the reference signal is based on applying the filter. In some examples, the filter determination component 1125 may determine that the reference signal and a second signal are quasi-collocated.

In some examples, the filter determination component 1125 may associate the one or more filter coefficients of the reference signal with the second signal based on the reference signal and the second signal being quasi-collocated. In some examples, the filter determination component 1125 may determine a type of quasi-collocation of the reference signal and a second signal. In some examples, the filter determination component 1125 may determine the one or more filter coefficients based on the type of quasi-collocation, where transmitting the indication is based on determining the one or more filter coefficients.

In some examples, the filter determination component 1125 may filter the reference signal based on the type of quasi-collocation. In some examples, the filter determination component 1125 may refrain from filtering the second signal based on the type of quasi-collocation.

In some examples, the filter determination component 1125 may identify one or more time-domain filter coefficients, where the one or more filter coefficients include the one or more time-domain filter coefficients. In some examples, the filter determination component 1125 may identify one or more frequency-domain filter coefficients, where the one or more filter coefficients include the one or more frequency-domain filter coefficients. In some examples, the filter determination component 1125 may identify a filtering configuration associated with the reference signal, where the one or more filter coefficients are based on the filtering configuration. In some examples, the filter determination component 1125 may apply a filter to the reference signal that uses the one or more filter coefficients, where transmitting the reference signal is based on applying the filter.

Figure 12:
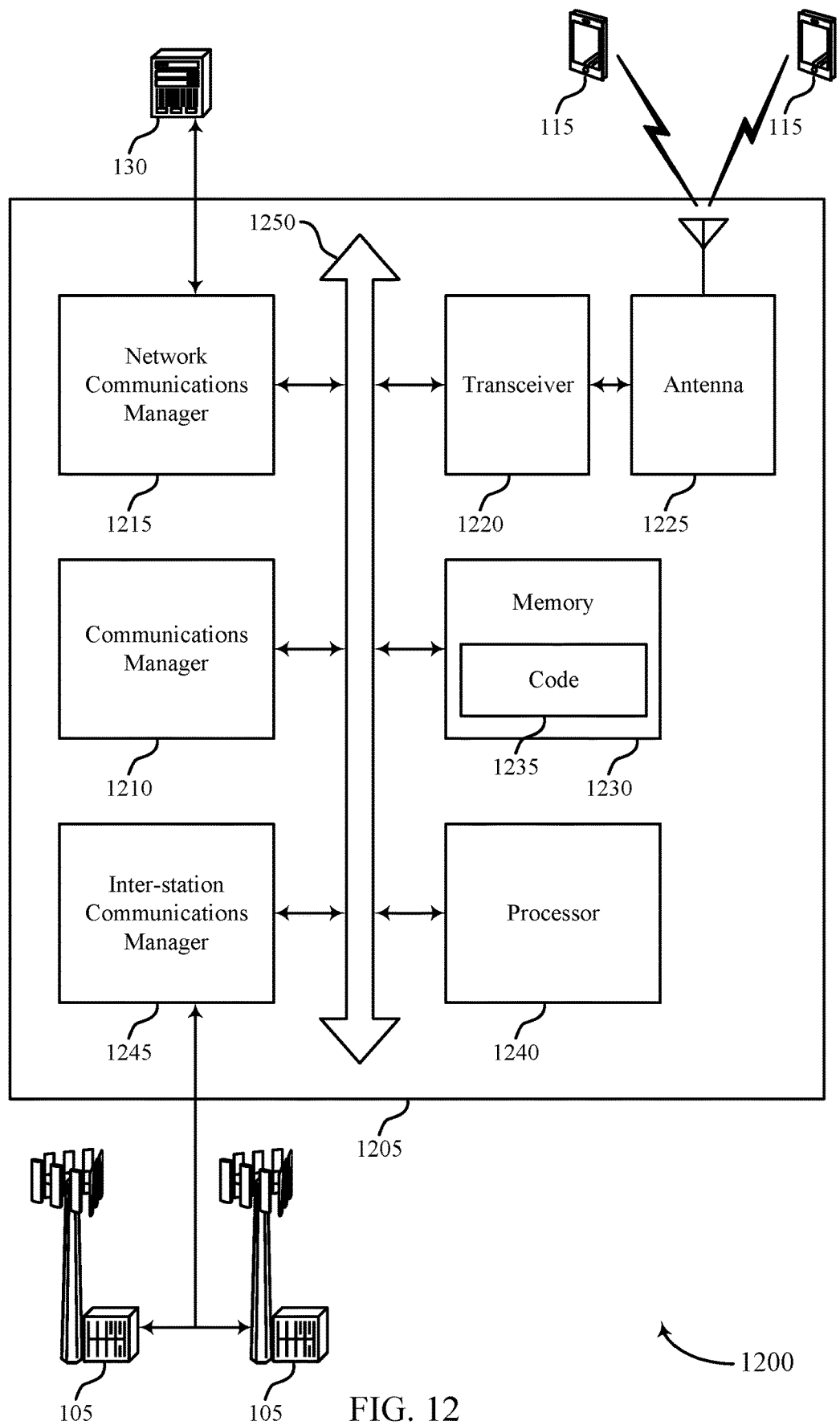
FIG. 12 shows a diagram of a system including a device that supports reference signal design in accordance with aspects of the present disclosure.

FIG. 12 shows a diagram of a system 1200 including a device 1205 that supports reference signal design in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit an indication of one or more filter coefficients used by the base station to filter a reference signal used by a UE to determine CQI, transmit the reference signal to the UE, generate the reference signal based on the one or more filter coefficients, and receive, from the UE, the CQI at least in part in response to the transmitted reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal design).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
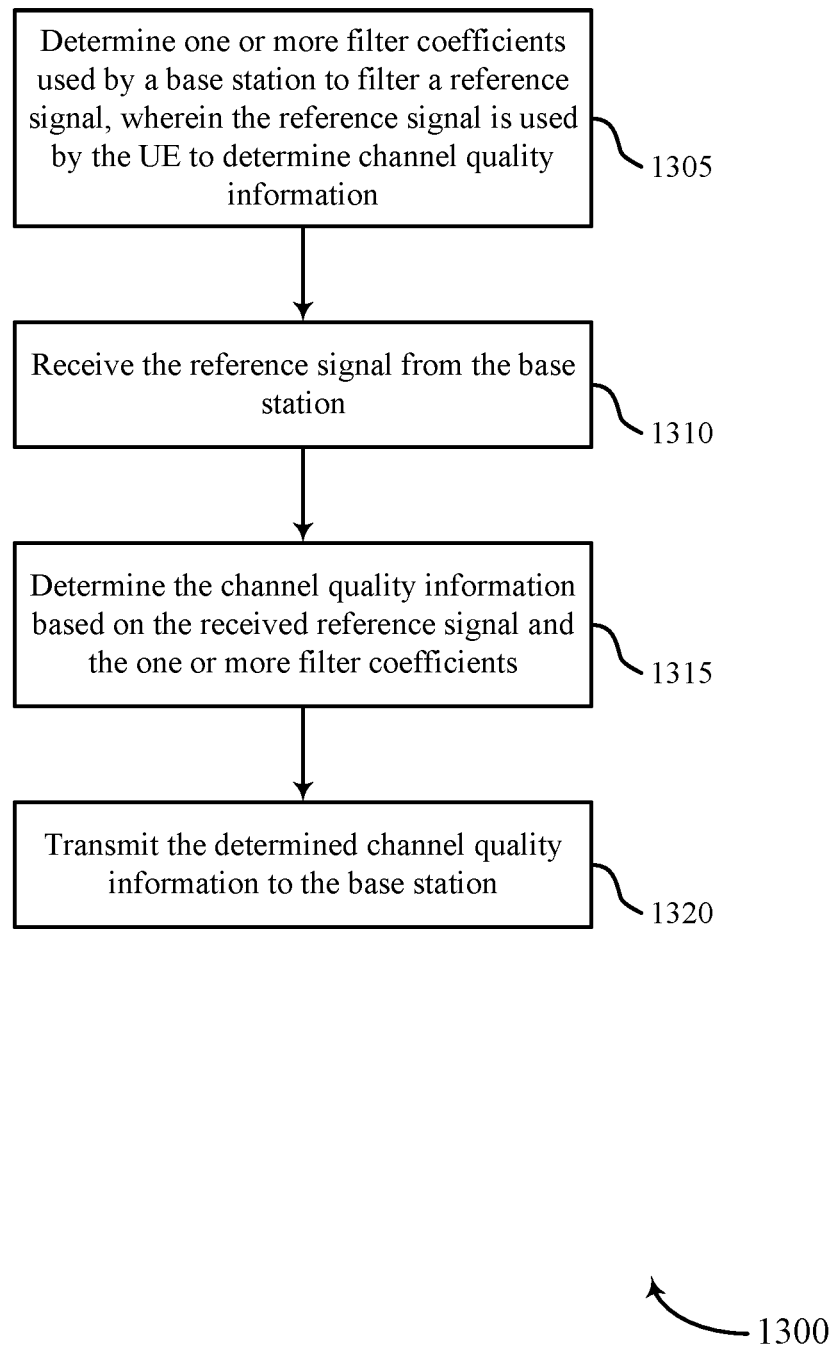
FIGS. 13 through 16 show flowcharts illustrating methods that support reference signal design in accordance with aspects of the present disclosure.

FIG. 13 shows a flowchart illustrating a method 1300 that supports reference signal design in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may determine one or more filter coefficients used by a base station to filter a reference signal, where the reference signal is used by the UE to determine CQI. In some cases, the UE may receive an indication of one or more filter coefficients used by a base station to filter a reference signal used by the UE to determine channel quality information. The operations of 1305 may be performed according to the methods described herein. In some examples, aspects of the operations of 1305 may be performed by a downlink reception component as described with reference to FIGS. 5 through 8.

At 1310, the UE may receive the reference signal from the base station. The operations of 1310 may be performed according to the methods described herein. In some examples, aspects of the operations of 1310 may be performed by a downlink reception component as described with reference to FIGS. 5 through 8.

At 1315, the UE may determine the channel quality information based on the received reference signal and the one or more filter coefficients. The operations of 1315 may be performed according to the methods described herein. In some examples, aspects of the operations of 1315 may be performed by a CQI determination component as described with reference to FIGS. 5 through 8.

At 1320, the UE may transmit the determined channel quality information to the base station. The operations of 1320 may be performed according to the methods described herein. In some examples, aspects of the operations of 1320 may be performed by an uplink transmission component as described with reference to FIGS. 5 through 8.

Figure 14:
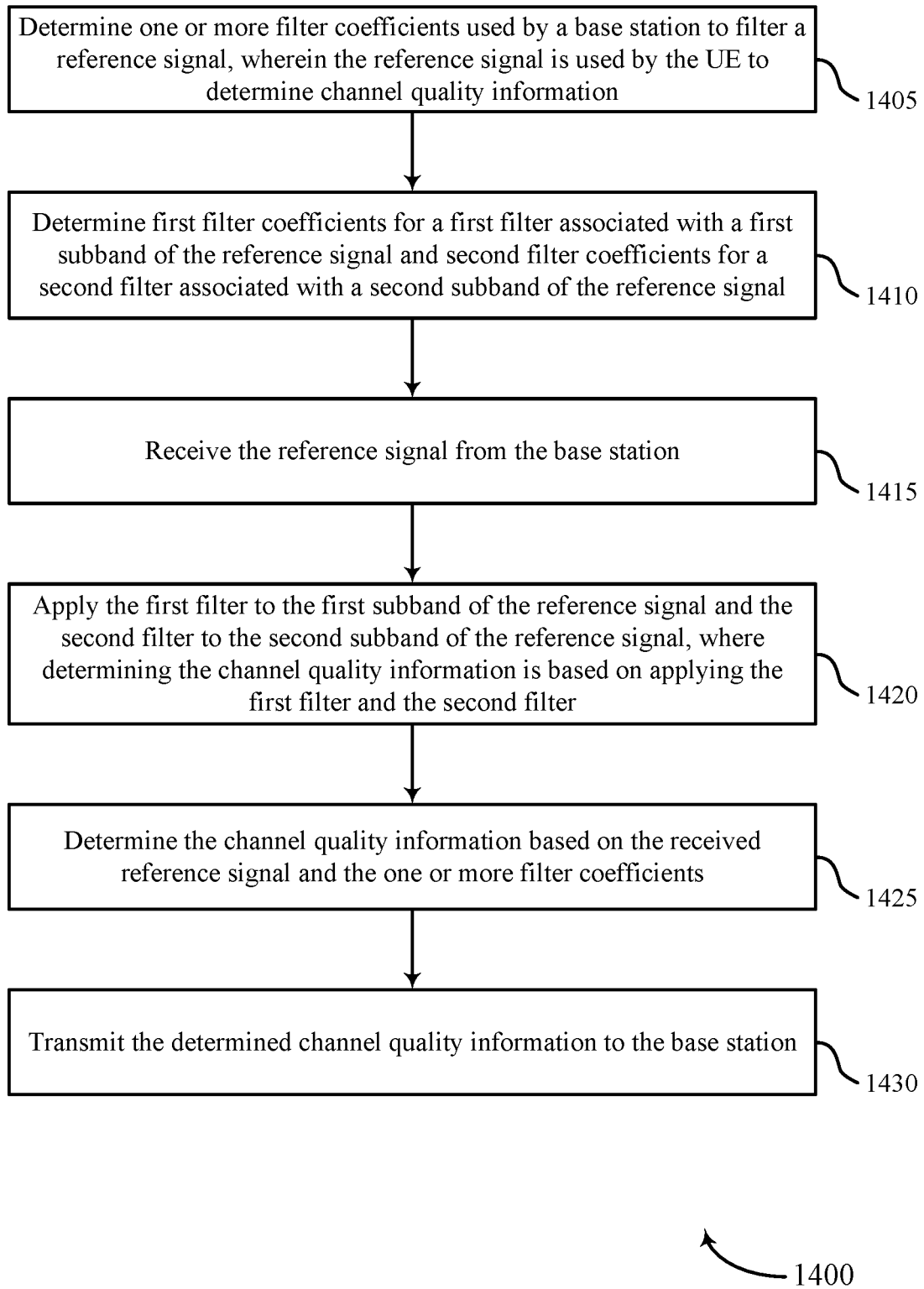

FIG. 14 shows a flowchart illustrating a method 1400 that supports reference signal design in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine one or more filter coefficients used by a base station to filter a reference signal, where the reference signal is used by the UE to determine CQI. In some cases, the UE may receive an indication of one or more filter coefficients used by a base station to filter a reference signal used by the UE to determine channel quality information. The operations of 1405 may be performed according to the methods described herein. In some examples, aspects of the operations of 1405 may be performed by a downlink reception component as described with reference to FIGS. 5 through 8.

At 1410, the UE may determine first filter coefficients for a first filter associated with a first subband of the reference signal and second filter coefficients for a second filter associated with a second subband of the reference signal. The operations of 1410 may be performed according to the methods described herein. In some examples, aspects of the operations of 1410 may be performed by a filter identification component as described with reference to FIGS. 5 through 8.

At 1415, the UE may receive the reference signal from the base station. The operations of 1415 may be performed according to the methods described herein. In some examples, aspects of the operations of 1415 may be performed by a downlink reception component as described with reference to FIGS. 5 through 8.

At 1420, the UE may apply the first filter to the first subband of the reference signal and the second filter to the second subband of the reference signal, where determining the channel quality information is based on applying the first filter and the second filter. The operations of 1420 may be performed according to the methods described herein. In some examples, aspects of the operations of 1420 may be performed by a filter application component as described with reference to FIGS. 5 through 8.

At 1425, the UE may determine the channel quality information based on the received reference signal and the one or more filter coefficients. The operations of 1425 may be performed according to the methods described herein. In some examples, aspects of the operations of 1425 may be performed by a CQI determination component as described with reference to FIGS. 5 through 8.

At 1430, the UE may transmit the determined channel quality information to the base station. The operations of 1430 may be performed according to the methods described herein. In some examples, aspects of the operations of 1430 may be performed by an uplink transmission component as described with reference to FIGS. 5 through 8.

Figure 15:
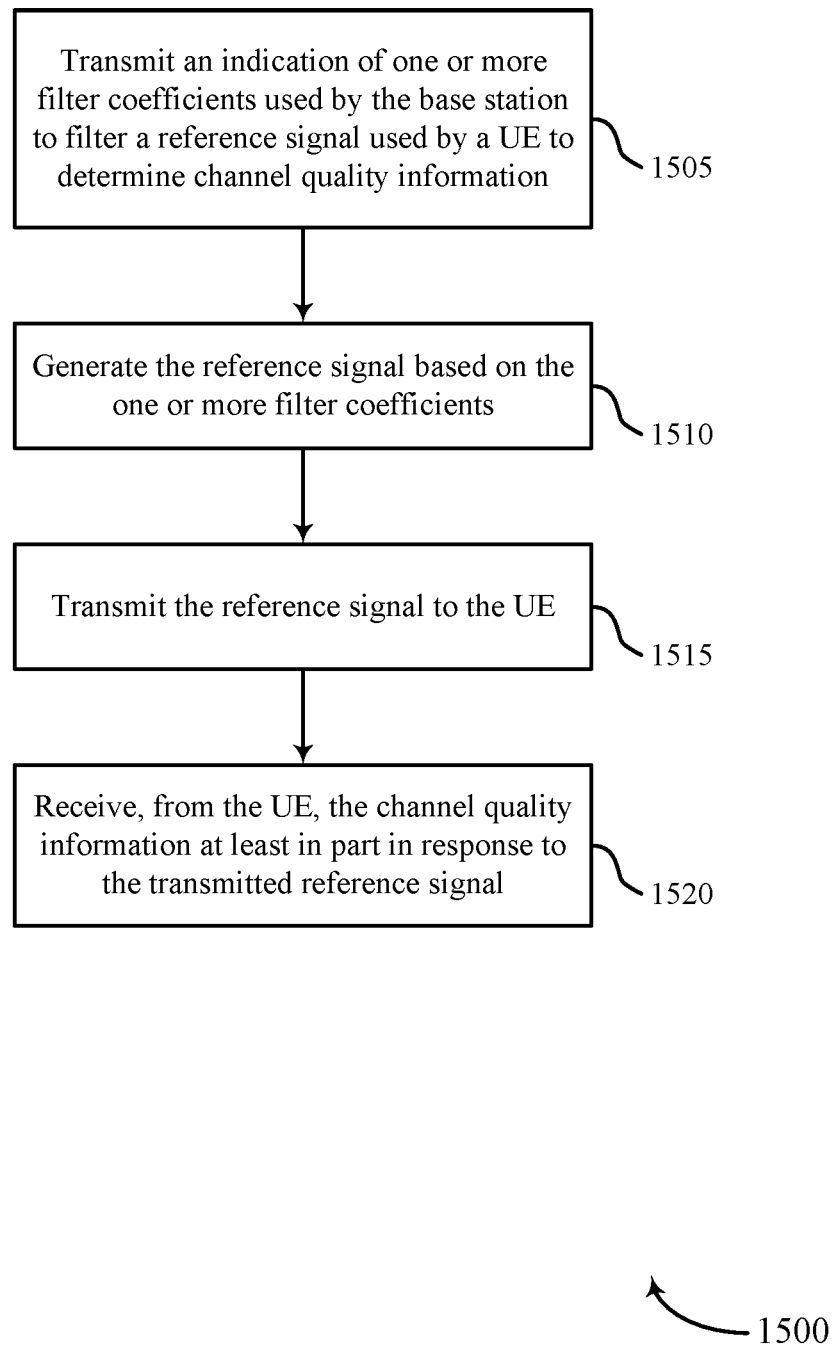

FIG. 15 shows a flowchart illustrating a method 1500 that supports reference signal design in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may transmit an indication of one or more filter coefficients used by the base station to filter a reference signal used by a UE to determine channel quality information. The operations of 1505 may be performed according to the methods described herein. In some examples, aspects of the operations of 1505 may be performed by a downlink transmission component as described with reference to FIGS. 9 through 12.

At 1510, the base station may generate the reference signal based on the one or more filter coefficients. The operations of 1510 may be performed according to the methods described herein. In some examples, aspects of the operations of 1510 may be performed by a reference signal generator as described with reference to FIGS. 9 through 12.

At 1515, the base station may transmit the reference signal to the UE. The operations of 1515 may be performed according to the methods described herein. In some examples, aspects of the operations of 1515 may be performed by a downlink transmission component as described with reference to FIGS. 9 through 12.

At 1520, the base station may receive, from the UE, the channel quality information at least in part in response to the transmitted reference signal. The operations of 1520 may be performed according to the methods described herein. In some examples, aspects of the operations of 1520 may be performed by an uplink reception component as described with reference to FIGS. 9 through 12.

Figure 16:
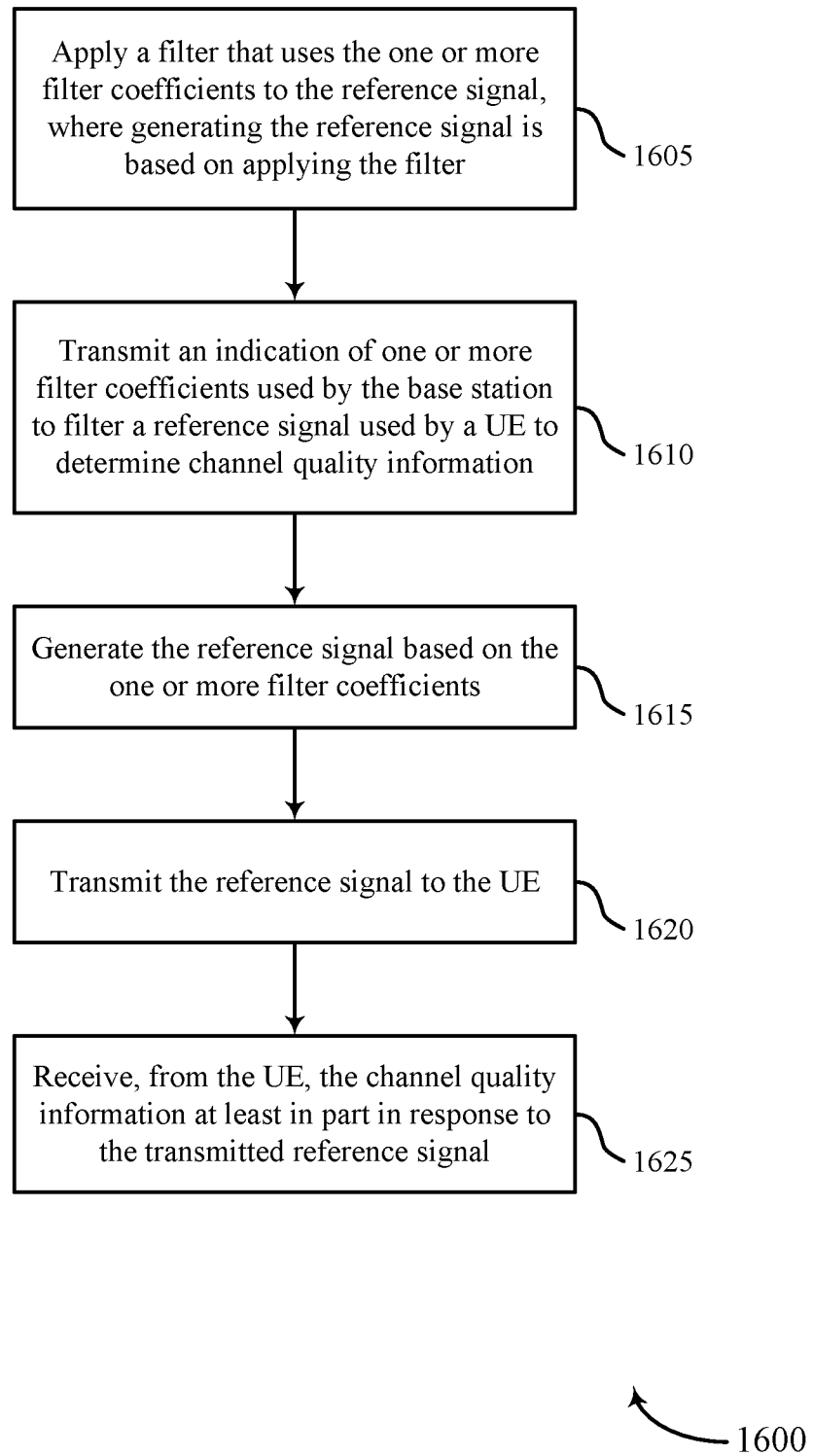

FIG. 16 shows a flowchart illustrating a method 1600 that supports reference signal design in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may apply a filter that uses the one or more filter coefficients to the reference signal, where generating the reference signal is based on applying the filter. The operations of 1605 may be performed according to the methods described herein. In some examples, aspects of the operations of 1605 may be performed by a filter determination component as described with reference to FIGS. 9 through 12.

At 1610, the base station may transmit an indication of one or more filter coefficients used by the base station to filter a reference signal used by a UE to determine channel quality information. The operations of 1610 may be performed according to the methods described herein. In some examples, aspects of the operations of 1610 may be performed by a downlink transmission component as described with reference to FIGS. 9 through 12.

At 1615, the base station may generate the reference signal based on the one or more filter coefficients. The operations of 1615 may be performed according to the methods described herein. In some examples, aspects of the operations of 1615 may be performed by a reference signal generator as described with reference to FIGS. 9 through 12.

At 1620, the base station may transmit the reference signal to the UE. The operations of 1620 may be performed according to the methods described herein. In some examples, aspects of the operations of 1620 may be performed by a downlink transmission component as described with reference to FIGS. 9 through 12.

At 1625, the base station may receive, from the UE, the channel quality information at least in part in response to the transmitted reference signal. The operations of 1625 may be performed according to the methods described herein. In some examples, aspects of the operations of 1625 may be performed by an uplink reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining one or more filter coefficients used by a network entity to filter a reference signal, the one or more filter coefficients being based at least in part on a type of the reference signal, wherein the reference signal is used by the UE to determine channel quality information;
   receiving the filtered reference signal from the network entity, the filtered reference signal being filtered by the network entity using the one or more filter coefficients;
   receiving a second signal;
   determining a type of quasi-collocation of the reference signal and the second signal, wherein the one or more filter coefficients associated with the filtered reference signal and one or more filter coefficients associated with the second signals are based at least in part on the type of quasi-collocation;
   measuring the channel quality information based at least in part on the filtered reference signal and the one or more filter coefficients; and
   transmitting, to the network entity, the channel quality information that is determined based at least in part on the filtered reference signal and based at least in part on the one or more filter coefficients determined to be used by the network entity.

2. The method of claim 1, further comprising:
   applying a filter to the received filtered reference signal using the one or more filter coefficients, wherein determining the channel quality information is based at least in part on applying the filter to the received filtered reference signal.

3. The method of claim 1, further comprising:
   determining first filter coefficients for a first filter associated with a first subband of the received filtered reference signal and second filter coefficients for a second filter associated with a second subband of the received filtered reference signal; and
   applying the first filter to the first subband of the received reference signal and the second filter to the second subband of the received filtered reference signal, wherein determining the channel quality information is based at least in part on applying the first filter and the second filter.

4. The method of claim 3, further comprising:
   determining, based at least in part on determining the first filter coefficients and the second filter coefficients, third filter coefficients for a third filter associated with the first subband and fourth filter coefficients for a fourth filter associated with the second subband;
   receiving a downlink signal; and
   applying the third filter to the first subband of the downlink signal and the fourth filter to the second subband of the downlink signal.

5. The method of claim 3, wherein the first filter coefficients and the second filter coefficients are based at least in part on the one or more filter coefficients determined to be used by the network entity.

6. The method of claim 3, further comprising:
   determining that a first bandwidth of the first subband is equal to a second bandwidth of the second subband, wherein the first filter coefficients are a same set of filter coefficients as the second filter coefficients based at least in part on the first bandwidth equaling the second bandwidth.

7. The method of claim 1, wherein a first bandwidth of the received reference signal is different than a second bandwidth associated with the channel quality information transmitted by the UE to the network entity.

8. The method of claim 1, further comprising:
   identifying a filtering configuration applied to the received filtered reference signal;
   identifying a filter to apply to the received filtered reference signal based at least in part on identifying the filtering configuration; and
   applying the filter to the received filtered reference signal, wherein determining the channel quality information is based at least in part on applying the filter.

9. The method of claim 8, further comprising:
   receiving, from the network entity, an indication of the filtering configuration applied to the received filtered reference signal, wherein identifying the filtering configuration is based at least in part on the received indication of the filtering configuration.

10. The method of claim 8, further comprising:
    identifying one or more parameters of a downlink channel configuration, wherein identifying the filtering configuration is based at least in part on identifying the one or more parameters of the downlink channel configuration.

11. The method of claim 1, wherein the one or more filter coefficients comprise one or more time-domain filter coefficients.

12. The method of claim 1, wherein the one or more filter coefficients comprise one or more frequency-domain filter coefficients.

13. The method of claim 12, wherein the one or more filter coefficients are associated with a plurality of frequency ranges.

14. The method of claim 1, further comprising:
    determining that the received filtered reference signal and the second signal are quasi-collocated, wherein one or more filter coefficients associated with the second signal are a same set of filter coefficients as the one or more filter coefficients associated with the received filtered reference signal.

15. The method of claim 1,
    wherein the second signal is unfiltered based at least in part on the type of quasi-collocation of the reference signal and the second signal.

16. The method of claim 1, wherein the received filtered reference signal is modulated using a π/2 binary phase shift keying (BPSK) modulation scheme.

17. The method of claim 1, wherein the received filtered reference signal comprises a channel state information reference signal.

18. The method of claim 1, further comprising:
    receiving an unfiltered reference signal from the network entity, wherein a first peak to average power ratio of the received filtered reference signal is less than a second peak to average power ratio of the received unfiltered reference signal.

19. The method of claim 1, further comprising:
    identifying the one or more filter coefficients based at least in part on receiving the one or more filter coefficients.

20. The method of claim 1, further comprising:
    receiving, from the network entity, the one or more filter coefficients used by the network entity to filter the reference signal, the one or more filter coefficients being based at least in part on the type of the reference signal, wherein the reference signal is used by the UE to determine the channel quality information and wherein the one or more filter coefficients are determined by the UE based at least in part on receiving the one or more filter coefficients from the network entity.

21. The method of claim 1, wherein the second signal is a second reference signal.

22. A method for wireless communication at a network entity, comprising:
determining a type of quasi-collocation of a reference signal and a second signal;
determining one or more filter coefficients to filter the reference signal used by a user equipment (UE) to determine channel quality information based at least in part on the type of quasi-collocation;
transmitting the one or more filter coefficients used by the network entity to filter the reference signal, the one or more filter coefficients being based at least in part on a type of the reference signal and based at least in part on determining the one or more filter coefficients;
generating the filtered reference signal based at least in part on the one or more filter coefficients;
transmitting the filtered reference signal and the second signal to the UE; and
receiving, from the UE, the channel quality information based at least in part on the filtered reference signal and based at least in part on the one or more filter coefficients transmitted to the UE.

23. The method of claim 22, further comprising:
applying a filter that uses the one or more filter coefficients to the reference signal, wherein generating the filtered reference signal is based at least in part on applying the filter.

24. The method of claim 22, further comprising:
determining that the filtered reference signal and the second signal are quasi-collocated; and
associating the one or more filter coefficients of the filtered reference signal with the second signal based at least in part on the filtered reference signal and the second signal being quasi-collocated.

25. The method of claim 22, further comprising:
filtering the reference signal based at least in part on the type of quasi-collocation; and
refraining from filtering the second signal based at least in part on the type of quasi-collocation.

26. The method of claim 22, further comprising:
modulating the filtered reference signal using a π/2 binary phase shift keying (BPSK) modulation scheme, wherein transmitting the filtered reference signal is based at least in part on modulating the filtered reference signal using the π/2 BPSK modulation scheme.

27. The method of claim 22, further comprising:
identifying a filtering configuration associated with the filtered reference signal, wherein the one or more filter coefficients are based at least in part on the filtering configuration; and
applying a filter to the filtered reference signal that uses the one or more filter coefficients, wherein transmitting the filtered reference signal is based at least in part on applying the filter.

28. The method of claim 22, wherein the second signal is a second reference signal.

29. An apparatus for wireless communication at a user equipment (UE), comprising:
a processor,
memory coupled with the processor; and
instructions stored in the memory and executable by the processor to cause the apparatus to:
determine one or more filter coefficients used by a network entity to filter a reference signal, the one or more filter coefficients being based at least in part on a type of the reference signal, wherein the reference signal is used by the UE to determine channel quality information;
receive the filtered reference signal from the network entity, the filtered reference signal being filtered by the network entity using the one or more filter coefficients;
receiving a second signal;
determine a type of quasi-collocation of the reference signal and the second signal, wherein the one or more filter coefficients associated with the filtered reference signal and one or more filter coefficients associated with the second signals are based at least in part on the type of quasi-collocation;
measure the channel quality information based at least in part on the filtered reference signal and the one or more filter coefficients; and
transmit, to the network entity, the channel quality information that is determined based at least in part on the filtered reference signal and the one or more filter coefficients determined to be used by the network entity.

30. An apparatus for wireless communication at a network entity, comprising:
a processor,
memory coupled with the processor; and
instructions stored in the memory and executable by the processor to cause the apparatus to:
determine a type of quasi-collocation of a reference signal and a second signal;
determine one or more filter coefficients to filter the reference signal used by a user equipment (UE) to determine channel quality information based at least in part on the type of quasi-collocation;
transmit the one or more filter coefficients used by the network entity to filter the reference signal, the one or more filter coefficients being based at least in part on a type of the reference signal and based at least in part on determining the one or more filter coefficients;
generate the filtered reference signal based at least in part on the one or more filter coefficients;
transmit the filtered reference signal and the second signal to the UE; and
receive, from the UE, the channel quality information based at least in part on the filtered reference signal and based at least in part on the one or more filter coefficients transmitted by the network entity.

* * * * *